United States Patent
Frank et al.

(10) Patent No.: US 10,556,822 B2
(45) Date of Patent: *Feb. 11, 2020

(54) COATED ARTICLE INCLUDING LOW-EMISSIVITY COATING INSULATING GLASS UNIT INCLUDING COATED ARTICLE, AND/OR METHODS OF MAKING THE SAME

(71) Applicant: Guardian Glass, LLC, Auburn Hills, MI (US)

(72) Inventors: Marcus Frank, Gelhausen (DE); Anton Dietrich, Fontnas (CH); Greg Miller, DeWitt, IA (US); Richard Blacker, Lino Lakes, MN (US); Muhammad Imran, Hamilton, NJ (US); Jean-Marc Lemmer, Wincheringen (DE)

(73) Assignees: GUARDIAN GLASS, LLC., Auburn Hills, MI (US); GUARDIAN EUROPE S.À R.L., Bertrange (LU)

(*) Notice: Subject to any disclaimer, the term of this patent is extended or adjusted under 35 U.S.C. 154(b) by 0 days.

This patent is subject to a terminal disclaimer.

(21) Appl. No.: 16/185,152

(22) Filed: Nov. 9, 2018

(65) Prior Publication Data

US 2019/0092682 A1 Mar. 28, 2019

Related U.S. Application Data

(60) Continuation of application No. 15/680,288, filed on Aug. 18, 2017, now Pat. No. 10,138,160, which is a
(Continued)

(51) Int. Cl.
*C03C 17/06* (2006.01)
*C03C 17/36* (2006.01)

(52) U.S. Cl.
CPC .......... *C03C 17/3626* (2013.01); *C03C 17/06* (2013.01); *C03C 17/36* (2013.01);
(Continued)

(58) Field of Classification Search
CPC ......... B05D 5/063; B32B 17/00; C03C 17/00; C03C 17/06; C03C 17/34; C03C 17/36;
(Continued)

(56) References Cited

U.S. PATENT DOCUMENTS

| 873,746 A | 12/1907 | Haynes |
| 4,410,489 A | 10/1983 | Asphahani et al. |

(Continued)

FOREIGN PATENT DOCUMENTS

| EP | 0 386 993 | 9/1990 |
| EP | 0 622 645 | 11/1994 |

(Continued)

OTHER PUBLICATIONS

U.S. Appl. No. 15/680,288, filed Aug. 18, 2017; Frank et al.
(Continued)

*Primary Examiner* — Elizabeth A Burkhart

(57) ABSTRACT

Certain example embodiments relate to a coated article including at least one infrared (IR) reflecting layer of a material such as silver or the like in a low-E coating, and methods of making the same. In certain cases, at least one layer of the coating is of or includes nickel and/or titanium (e.g., $Ni_xTi_yO_z$). The provision of a layer including nickel titanium and/or an oxide thereof may permit a layer to be used that has good adhesion to the IR reflecting layer, and reduced absorption of visible light (resulting in a coated article with a higher visible transmission). When a layer including nickel titanium oxide is provided directly over and/or under the IR reflecting layer (e.g., as a barrier layer), this may result in improved chemical and mechanical dura-
(Continued)

bility. Thus, visible transmission may be improved if desired, without compromising durability; or, durability may simply be increased.

7 Claims, 7 Drawing Sheets

Related U.S. Application Data continuation of application No. 13/738,163, filed on Jan. 10, 2013, now Pat. No. 9,751,801, which is a division of application No. 13/064,066, filed on Mar. 3, 2011, now Pat. No. 8,557,391.

(60) Provisional application No. 61/446,411, filed on Feb. 24, 2011.

(52) U.S. Cl.
CPC ........ *C03C 17/366* (2013.01); *C03C 17/3639* (2013.01); *C03C 17/3652* (2013.01); *Y10T 156/10* (2015.01); *Y10T 428/12549* (2015.01); *Y10T 428/12597* (2015.01)

(58) Field of Classification Search
CPC ... C03C 17/3602; C03C 17/3626; G02B 5/08; G02B 5/0808; G02B 1/00; C23C 14/18
USPC .................................................. 427/162, 165
See application file for complete search history.

(56) References Cited

U.S. PATENT DOCUMENTS

| | | | |
|---|---|---|---|
| 4,537,798 A | 8/1985 | Cohen | |
| 4,820,486 A | 4/1989 | Shimogori et al. | |
| 4,906,437 A | 3/1990 | Heubner et al. | |
| 5,156,894 A | 10/1992 | Hood et al. | |
| 5,242,560 A | 9/1993 | Lingle et al. | |
| 5,269,108 A | 12/1993 | Fremaux | |
| 5,344,718 A | 9/1994 | Hartig et al. | |
| 5,563,734 A | 10/1996 | Wolfe et al. | |
| 5,595,825 A | 1/1997 | Guiselin | |
| 5,688,585 A | 11/1997 | Lingle et al. | |
| 5,821,001 A | 10/1998 | Arbab et al. | |
| 5,942,338 A | 8/1999 | Arbab et al. | |
| 6,045,896 A | 4/2000 | Boire et al. | |
| 6,159,607 A | 12/2000 | Hartig et al. | |
| 6,159,621 A | 12/2000 | Schicht et al. | |
| RE37,446 E | 11/2001 | Miyazaki et al. | |
| 6,340,529 B1 | 1/2002 | Ebisawa et al. | |
| 6,346,174 B1 | 2/2002 | Finley et al. | |
| 6,398,925 B1 | 6/2002 | Arbab et al. | |
| 6,472,072 B1 | 10/2002 | Ebisawa et al. | |
| 6,503,636 B1 | 1/2003 | Le Masson et al. | |
| 6,524,714 B1 | 2/2003 | Neuman et al. | |
| 6,541,133 B1 | 4/2003 | Schicht et al. | |
| 6,562,490 B2 | 5/2003 | Ebisawa et al. | |
| 6,572,940 B1 | 6/2003 | Noethe et al. | |
| 6,576,349 B2 | 6/2003 | Lingle et al. | |
| 6,579,427 B1 | 6/2003 | Arbab et al. | |
| 6,582,809 B2 | 6/2003 | Boire et al. | |
| 6,602,608 B2 | 8/2003 | Stachowiak | |
| 6,610,410 B2 | 8/2003 | Ebisawa et al. | |
| 6,699,585 B2 | 3/2004 | Ebisawa et al. | |
| 6,783,861 B2 | 8/2004 | Ebisawa et al. | |
| 6,783,876 B2 | 8/2004 | Schicht et al. | |
| 6,797,389 B1 | 9/2004 | Depauw | |
| 6,802,943 B2 | 10/2004 | Stachowiak | |
| 6,890,659 B2 | 5/2005 | Stachowiak | |
| 6,899,953 B1 | 5/2005 | O'Shaughnessy et al. | |
| 6,967,060 B2 | 11/2005 | Stachowiak | |
| 7,060,359 B2 | 6/2006 | Eby et al. | |
| 7,081,301 B2 | 7/2006 | Stachowiak | |
| 7,101,810 B2 | 9/2006 | Bond et al. | |
| 7,147,924 B2 | 12/2006 | Stachowiak | |
| 7,166,360 B2 | 1/2007 | Coustet et al. | |
| 7,198,850 B2 | 4/2007 | Depauw | |
| 7,258,757 B2 | 8/2007 | Stachowiak | |
| 7,329,433 B2 | 2/2008 | O'Shaughnessy et al. | |
| 7,339,728 B2 | 3/2008 | Hartig | |
| 7,342,716 B2 | 3/2008 | Hartig | |
| 7,494,717 B2 | 2/2009 | Decroupet et al. | |
| 7,572,509 B2 | 8/2009 | Hartig | |
| 7,572,510 B2 * | 8/2009 | Hartig .................... | C03C 17/36 428/428 |
| 7,572,511 B2 | 8/2009 | Hartig | |
| 7,582,356 B2 | 9/2009 | Brochot et al. | |
| 7,655,313 B2 | 2/2010 | Blacker et al. | |
| 7,745,009 B2 | 6/2010 | Decroupet et al. | |
| 7,807,248 B2 | 10/2010 | German et al. | |
| 7,858,191 B2 | 12/2010 | Lemmer | |
| 7,906,203 B2 | 3/2011 | Hartig | |
| 8,231,977 B2 | 7/2012 | Roquiny et al. | |
| 8,337,988 B2 | 12/2012 | Knoll et al. | |
| 9,751,801 B2 * | 9/2017 | Frank .................... | C03C 17/36 |
| 10,138,160 B2 * | 11/2018 | Frank .................... | C03C 17/36 |
| 2002/0022132 A1 | 2/2002 | Ebisawa et al. | |
| 2004/0101694 A1 | 5/2004 | Lingle et al. | |
| 2004/0197574 A1 | 10/2004 | Stachowiak | |
| 2004/0224167 A1 | 11/2004 | Stachowiak | |
| 2006/0090834 A1 * | 5/2006 | Huang ............... | B32B 17/10009 156/99 |
| 2007/0009747 A1 | 1/2007 | Medwick et al. | |
| 2007/0128449 A1 | 6/2007 | Taylor et al. | |
| 2008/0038148 A1 | 2/2008 | Crook | |
| 2008/0128071 A1 | 6/2008 | Murphy | |
| 2008/0226925 A1 | 9/2008 | Blacker et al. | |
| 2008/0311389 A1 | 12/2008 | Roquiny et al. | |
| 2009/0004043 A1 | 1/2009 | Tawancy | |
| 2009/0047466 A1 | 2/2009 | German et al. | |
| 2009/0136765 A1 | 5/2009 | Maschwitz et al. | |
| 2009/0176086 A1 | 7/2009 | Martin et al. | |
| 2009/0205956 A1 | 8/2009 | Lu et al. | |
| 2009/0214880 A1 | 8/2009 | Lemmer | |
| 2009/0233037 A1 | 9/2009 | Medwick et al. | |
| 2009/0233071 A1 | 9/2009 | Medwick et al. | |
| 2009/0324934 A1 | 12/2009 | Blacker et al. | |
| 2009/0324967 A1 | 12/2009 | Distelforf et al. | |
| 2010/0062245 A1 | 3/2010 | Martin et al. | |
| 2010/0075155 A1 | 3/2010 | Veerasamy | |
| 2010/0104840 A1 | 4/2010 | Blacker et al. | |
| 2010/0167034 A1 | 7/2010 | Depauw et al. | |
| 2010/0221575 A1 | 9/2010 | Stull | |
| 2011/0135955 A1 | 6/2011 | Maschwitz et al. | |
| 2011/0261442 A1 | 10/2011 | Knoll et al. | |
| 2011/0262726 A1 | 10/2011 | Knoll et al. | |
| 2012/0087005 A1 * | 4/2012 | Reymond ............... | C03C 17/36 359/360 |
| 2012/0225304 A1 | 9/2012 | Imran et al. | |
| 2012/0225316 A1 | 9/2012 | Imran et al. | |
| 2012/0225317 A1 | 9/2012 | Imran et al. | |
| 2012/0308811 A1 | 12/2012 | Roquiny et al. | |

FOREIGN PATENT DOCUMENTS

| | | |
|---|---|---|
| EP | 0 779 255 | 6/1997 |
| FR | 2 924 232 | 5/2009 |
| JP | 2003-515521 | 5/2003 |
| JP | 2005-524598 | 8/2005 |
| JP | 2007-106668 | 4/2007 |
| JP | 2007-512218 | 5/2007 |
| JP | 2010-521410 | 6/2010 |
| KR | 10-2008-0053510 | 6/2008 |
| WO | WO 97/48649 | 5/1997 |
| WO | WO 00/37381 | 6/2000 |
| WO | WO 03/020656 | 3/2003 |
| WO | WO 2003/093188 | 11/2003 |
| WO | WO 2009/122090 | 10/2009 |
| WO | WO 2010/043828 | 4/2010 |
| WO | WO 2010/053921 | 5/2010 |

(56) References Cited

FOREIGN PATENT DOCUMENTS

| WO | WO 2010/142926 | 12/2010 |
|----|----------------|---------|
| WO | WO 2012/118468 | 9/2012  |

OTHER PUBLICATIONS

Korean Office Action dated Feb. 13, 2018 for KR Application No. 10-2013-7023200.
U.S. Appl. No. 13/064,063, filed Mar. 3, 2011; Imran et al.
U.S. Appl. No. 61/446,411, filed Feb. 24, 2011; Frank et al.
U.S. Appl. No. 13/064,066, filed Mar. 3, 2011; Frank et al.
International Search Report dated Apr. 23, 2012.
U.S. Appl. No. 13/064,064, filed Mar. 3, 2011; Imran et al.
U.S. Appl. No. 13/064,065, filed Mar. 3, 2011; Blacker et al.
U.S. Appl. No. 12/213,879, Disteldorf et al., filed Jun. 25, 2008.
U.S. Appl. No. 12/654,594, Blacker et al., filed Mar. 15, 2007.
U.S. Appl. No. 12/926,714, Lemmer et al., filed Dec. 6, 2010.
U.S. Appl. No. 12/923,082, McLean et al., filed Aug. 31, 2010.
U.S. Appl. No. 12/662,894, Lemmer et al., filed May 10, 2010.
U.S. Appl. No. 12/659,196, Lemmer et al., filed Feb. 26, 2010.
U.S. Appl. No. 12/385,802, Lu et al., filed Apr. 21, 2009.
U.S. Appl. No. 12/461,792, Blacker et al., filed Sep. 18, 2006.
U.S. Appl. No. 12/591,611, Veerasamy, filed Dec. 21, 2006.
U.S. Appl. No. 13/738,163, filed Jan. 10, 2013; Frank et al.
Haynes International (http:/www.haynesintl.com/pdf/h2019.pdf), 2002.
Haynes International (http:/www.haynesintl.com/pdf/h2069.pdf), 2009.
Engineering Alloys (http:/www.engineering-alloys.com/toolbox-material-data-sheet-uns-n06022-alloy22.htm), 2009.

\* cited by examiner

COATED ARTICLE INCLUDING LOW-EMISSIVITY COATING INSULATING GLASS UNIT INCLUDING COATED ARTICLE, AND/OR METHODS OF MAKING THE SAME

This application is a Continuation of application Ser. No. 15/680,288, filed Aug. 18, 2017, which is a Continuation of application Ser. No. 13/738,163, filed Jan. 10, 2013 (now U.S. Pat. No. 9,751,801), which is a Divisional of application Ser. No. 13/064,066 filed Mar. 3, 2011 (now U.S. Pat. No. 8,557,391) the disclosures of which are incorporated herein by reference. This application also claims the benefit of U.S. Application Ser. No. 61/446,411, filed on Feb. 24, 2011, the entire contents of which are hereby incorporated herein by reference. This application also incorporates by reference the entire contents of U.S. application Ser. No. 13/064,065, filed Mar. 3, 2011, (now U.S. Pat. No. 8,790,783), as well as U.S. application Ser. No. 13/064,064, filed Mar. 3, 2011, (now U.S. Pat. No. 8,709,604).

Certain example embodiments of this application relate to a coated article including at least one infrared (IR) reflecting layer of a material such as silver or the like in a low-E coating. In certain embodiments, at least one layer of the coating is of or includes nickel and/or titanium (e.g., $Ni_xTi_y$, $Ni_xTi_yO_z$, etc.). In certain example embodiments, the provision of a layer comprising nickel titanium and/or an oxide thereof permits a layer to be used that has good adhesion to the IR reflecting layer, and reduced absorption of visible light (resulting in a coated article with a higher visible transmission). When a layer comprising nickel titanium oxide is provided directly over and/or under the IR reflecting layer (e.g., as a barrier layer), this results in improved chemical and mechanical durability in certain example embodiments. Thus, in certain example embodiments, visible transmission may be improved if desired, while having a reduced impact on durability. Coated articles herein may be used in the context of insulating glass (IG) window units, vehicle windows, or in other suitable applications such as monolithic window applications, laminated windows, and/or the like.

BACKGROUND AND SUMMARY OF EXAMPLE EMBODIMENTS OF THE INVENTION

Coated articles are known in the art for use in window applications such as insulating glass (IG) window units, vehicle windows, monolithic windows, and/or the like. In certain example instances, designers of coated articles often strive for a combination of high visible transmission, low emissivity (or low emittance), and/or low sheet resistance ($R_s$). High visible transmission may permit coated articles to be used in applications where these characteristics are desired such as in architectural or vehicle window applications, whereas low-emissivity (low-E), and low sheet resistance characteristics permit such coated articles to block significant amounts of IR radiation so as to reduce for example undesirable heating of vehicle or building interiors. Thus, typically, for coatings used on architectural glass to block significant amounts of IR radiation, high transmission in the visible spectrum is often desired.

The IR reflecting layer(s) in low-E coatings impact the overall coating, and in some cases the IR reflecting layer(s) is the most sensitive layer in the stack. Unfortunately, IR reflecting layers comprising silver may sometimes be subject to damage from the deposition process, subsequent atmospheric processes, and/or heat treatment. In certain cases, a silver-based layer in a low-E coating may need to be protected from oxygen present while other layers are deposited over the silver-based layer. If the IR reflecting layer(s) in the coating is/are not sufficiently protected, the durability, visible transmission, and/or other optical characteristics of the coated article may suffer.

Accordingly, it will be appreciated by one skilled in the art that the there is a need for a low-E coating with improved durability and improved or substantially unchanged optical properties.

Certain example embodiments of this invention relate to an improved barrier layer material used in connection with an IR reflecting layer comprising silver. In certain instances, the improved barrier layer material may permit the durability of the coated article to be improved. Such barrier layers may include Ni and Ti, or an oxide thereof in different embodiments of this invention.

Certain example embodiments relate to a method of making a coated article including a coating supported by a glass substrate. At least one first dielectric layer is disposed on the substrate. A first layer comprising Ag is disposed on the at least one first dielectric layer. A layer comprising Ni and/or Cr is disposed over and contacting the first layer comprising Ag. At least one second dielectric layer is disposed on the layer comprising Ni and/or Cr. A second layer comprising Ag is disposed on the at least one second dielectric layer. A first layer comprising Ni and Ti is disposed over and contacting the second layer comprising Ag. At least one third dielectric layer is disposed on the first layer comprising Ni and Ti. A third layer comprising Ag is disposed on the at least one third dielectric layer. A second layer comprising Ni and Ti is disposed over and contacting the third layer comprising Ag. At least one fourth dielectric layer is disposed on the second layer comprising Ni and Ti.

Certain example embodiments relate to a method of making a coated article including a coating supported by a glass substrate. At least one first dielectric layer is disposed on the substrate. A first layer comprising Ag is disposed on the at least one first dielectric layer. A layer comprising Ni and/or Cr is disposed over and contacting the first layer comprising Ag. At least one second dielectric layer is disposed on the layer comprising Ni and/or Cr. A second layer comprising Ag is disposed on the at least one second dielectric layer. A first layer comprising Ni and/or Ti is disposed over and contacting the second layer comprising Ag. At least one third dielectric layer is disposed on the first layer comprising Ni and/or Ti. A third layer comprising Ag is disposed on the at least one third dielectric layer. A second layer comprising Ni and/or Ti is disposed over and contacting the third layer comprising Ag. At least one fourth dielectric layer is disposed on the second layer comprising Ni and/or Ti. The third layer comprising Ag is thicker than the second layer comprising Ag.

Certain example embodiments also relate to coated articles and/or IG units made by one of the above-described and/or other methods. In IG unit embodiments, for example, the coating of the coated article may be provided on surface 2 and/or 3.

DETAILED DESCRIPTION OF THE INVENTION

Figure 1:
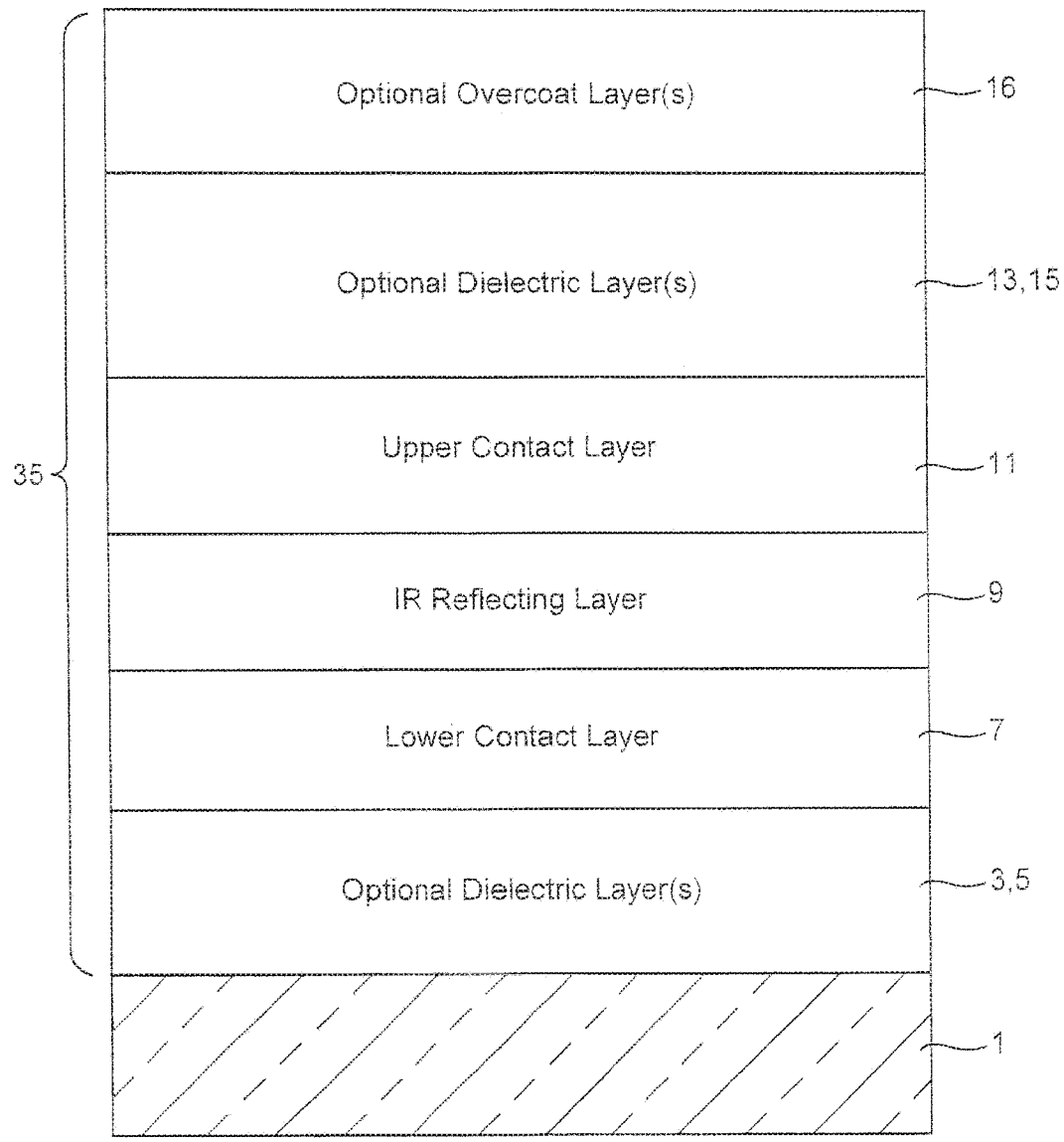
FIG. 1 is a cross-sectional view of a coated article according to an example embodiment of this invention.

Referring now to the drawings in which like reference numerals indicate like parts throughout the several views.

Coated articles herein may be used in coated article applications such as monolithic windows, IG window units, vehicle windows, and/or any other suitable application that includes single or multiple substrates such as glass substrates.

As indicated above, in certain cases, a silver-based layer in a low-E coating may need to be protected during subsequent processes. For example, the oxygen in the plasma used to deposit subsequent layers may be highly ionized and the silver-based layer may need to be protected from it. Also, in post-deposition "atmospheric processes," the silver-based layer may be susceptible to attacks from oxygen, moisture, acids, bases, and/or the like. This may be particularly true if a layer located between the silver-based layer and the atmosphere has any defects, such that the silver-based layer is not covered entirely (e.g., scratches, pin holes, etc.).

Furthermore, problems may arise during heat-treating in certain example embodiments. In those cases, oxygen may diffuse into the silver-based layer. In certain example embodiments, oxygen that reaches the silver-based layer may affect its properties, such as by decreasing sheet resistance, affecting emissivity, and/or producing haze, etc., and may result in reduced performance by the layer stack.

In certain example embodiments, barrier layers may therefore be used with silver-based layers (and/or other IR reflecting layers) in low-E coatings in order to reduce the occurrence of some or all of the above-described and/or other issues.

In the past, barrier layer materials have comprised thin metallic layers, such as Al, that were oxidized during the subsequent oxidic process in certain example cases. In other cases, indium tin oxide (ITO)-based layers were also used. However, these materials may compromise optical properties and/or durability of the overall layer stack in certain of such cases.

Materials such as chromium may be used in barrier layers in certain cases; particularly in coated articles with low-E coatings used in the architectural market. However, chromium may absorb significant amounts visible light in certain example embodiments. The absorption, k, of chromium oxide at 550 nm is 0.033942. Accordingly, the visible transmission of a coated article may be reduced if a layer comprising chromium is too thick, and/or not oxidized enough. However, the layer comprising silver may not be thoroughly protected if the thickness of the barrier is not sufficient.

Another barrier layer material that may be used is titanium (e.g., TiOx). However, the adhesion of titanium to IR reflecting layers, particularly those that comprise silver, is lacking. Therefore, when a material consisting of or consisting essentially of Ti and/or oxides thereof is used as a barrier layer to protect a layer comprising silver, the durability of the coated article may be compromised and/or reduced.

In view of the foregoing, it would be advantageous to provide a barrier layer comprising material(s) that have sufficient adhesion at the interface between the silver (and/or IR reflecting layer) and the barrier material, where the oxide of the barrier material(s) has a lower absorption in the visible spectral range.

Certain embodiments of this invention relate to a coated article that includes at least one glass substrate supporting a coating. The coating typically has at least one infrared (IR) reflecting layer that reflects and/or blocks at least some IR radiation. The IR reflecting layer(s) may be of or include a material such as silver, gold, NiCr or the like in different embodiments of this invention. Often, an IR reflecting layer is sandwiched between at least first and second contact layers of the coating.

In certain example embodiments of this invention, it has surprisingly been found that the provision of a layer consisting essentially of, or comprising, an oxide of nickel and/or titanium (e.g., $Ni_xTi_y$, or $Ni_xTi_yO_z$, etc.) as a contact layer(s) (e.g., in contact with an IR reflecting layer) in such a coating unexpectedly improves the mechanical and chemical durability of the coating in a manner that does not significantly degrade other optical properties of a coated article such as visible transmission and/or color. One or more such nickel and/or titanium inclusive layers (which may be oxided in certain example embodiments) may be provided in a given coating in different embodiments of this invention. Moreover, such nickel and/or titanium inclusive layer(s) may be provided in any type of solar control or low-E (low-emissivity, or low-emittance) coating in different embodiments of this invention (e.g., as a contact layer), and the specific low-E coatings described herein are for purposes of example only unless recited in the claim(s). When a layer comprising nickel titanium oxide is provided as the upper contact layer of the coated article (e.g., over a silver based IR reflecting layer), this results in improved chemical and mechanical durability in certain example embodiments. The use of a layer of nickel titanium oxide in this respect (e.g., as a contact layer) has surprisingly been found to improve chemical and mechanical durability of the coated article, and has also been found to improve (or at least not substantially degrade) the visible transmission of the coated article.

In certain example embodiments, a barrier layer comprising nickel titanium and/or an oxide thereof may be provided. This combination of Ni and Ti may provide good adhesion with lower absorption, which are both desirable qualities for low-E coatings in certain example embodiments. Advantageously, the provision of a barrier layer comprising nickel titanium and/or an oxide thereof (e.g., $Ni_xTi_y$, $Ni_xTi_yO_z$, etc.) may permit a durable, monolithic coated article with a single IR reflecting layer (e.g., silver) to be utilized, without the properties of the coating degrading because of insufficient protection of the IR reflecting layer.

FIG. 1 is a cross-sectional view of a coated article according to an example embodiment of this invention. In certain example embodiments, the coated article illustrated in FIG. 1 may be used as a monolithic window with a low-E coating on surface 1 and/or 2, where the low-E coating includes only a single IR reflecting layer. However, in other example embodiments, the coated article in FIG. 1 may comprise further layers. Furthermore, a coated article made according to example embodiments described herein may be used in an insulated glass unit (IGU), with the coating(s) on surface 1, 2, 3, and/or 4; in a laminated monolithic lite with the coating embedded against the interlayer on surfaces 2 and/or 3, or exposed on surface 4; in a laminated IGU, with a laminate outboard with the coating embedded against the interlayer on surfaces 2 and/or 3, or exposed on surface 4; in a laminated IGU, with a laminated inboard with the coated exposed on surfaces 3 and/or 6, or embedded on surfaces 4 and/or 5, according to different example embodiments and applications. In other words, this coating may be used monolithicly, or in IG units comprising two or more substrates, or more than once in a glass unit, and may be provided on any surface of the unit in different example embodiments.

The coated article includes glass substrate 1 (e.g., clear, green, bronze, or blue-green glass substrate from about 1.0 to 10.0 mm thick, more preferably from about 1.0 mm to 6.0 mm thick), and a multi-layer coating 35 (or layer system) provided on the substrate either directly or indirectly.

As shown in FIG. 1, the coating 35 comprises optional dielectric layer(s) 3 and/or 5, lower contact layer 7, which may be of or include nickel and/or titanium and/or an oxide thereof (e.g., $Ni_xTi_y$, $Ni_xTi_yO_z$, etc.), or which may be of another suitable contact layer material such as oxides and/or nitrides of Zn, Ni, Cr, combinations thereof, and/or the like, IR reflecting layer 9 including one or more of silver, gold, or the like, upper contact layer 11 of or including nickel and/or titanium and/or an oxide thereof (e.g., $Ni_xTi_y$, $Ni_xTi_yO_z$, etc.) or another suitable contact layer material, optional dielectric layer(s) 13 and/or 15, and dielectric layer 16 of or including a material such as silicon oxide, silicon nitride, silicon oxynitride, zirconium oxide, zirconium oxynitride, or zirconium silicon oxynitride that may in certain example instances be a protective overcoat. Other layers and/or materials may also be provided in certain example embodiments of this invention, and it is also possible that certain layers may be removed or split in certain example instances. Layer 16 may or may not be provided according to different example embodiments.

Optional dielectric layers 3 and/or 5 may comprise silicon nitride, titanium oxide, tin oxide, silicon oxide, silicon oxynitride, and/or other dielectric materials according to different example embodiments.

Infrared (IR) reflecting layer 9 is preferably substantially or entirely metallic and/or conductive, and may comprise or consist essentially of silver (Ag), gold, or any other suitable IR reflecting material. IR reflecting layer 9 helps allow the coating to have low-E and/or good solar control characteristics such as low emittance, low sheet resistance, and so forth. The IR reflecting layer 9 may, however, be slightly oxidized in certain embodiments of this invention.

The IR reflecting layers shown in FIG. 1 and described herein may comprise or consist essentially of silver in different example embodiments. Thus, it will be appreciated that certain example embodiments may include silver alloys. In such cases, Ag may be alloyed with an appropriate amount of Zr, Ti, Ni, Cr, Pd, and/or combinations thereon. In certain example embodiments, Ag may be alloyed with both Pd and Cu, with approximately 0.5-2% (by weight or atomic %) of each of Pd and Cu. Other potential alloys include Ag and one or more of Co, C, Mg, Ta, W, NiMg, PdGa, CoW, Si, Ge, Au, Pt, Ru, Sn, Al, Mn, V, In, Zn, Ir, Rh, and/or Mo. In general, dopant concentrations may be in the range of 0.2-5% (by weight or atomic %), more preferably between 0.2-2.5%. Operating within these ranges may help the silver maintain the desirable optical characteristics of the Ag-based layer that otherwise might be lost by virtue of the alloying, thereby helping to maintain the overall optical characteristics of the stack while also enhancing chemical, corrosion, and/or mechanical durability. The example Ag alloy target materials identified herein may be sputtered using a single target, deposited by co-sputtering using two (or more targets), etc. In addition to providing improved corrosion resistance, the use of Ag alloys may in certain instances help to reduce the silver diffusivity at elevated temperatures while also helping to reduce or block the amount of oxygen movement in the layer stacks. This may further enhance silver diffusivity and may change those Ag growth and structural properties that potentially lead to bad durability.

The upper and lower contact layers 7 and 11 may be of or include Ni and/or Ti, and/or oxides and/or nitrides thereof. In certain example embodiments, upper and lower contact layers 7, 11 may be of or include nickel (Ni), titanium (Ti), chromium/chrome (Cr), a nickel alloy such as nickel titanium (NiTi) and/or nickel chromium, (e.g., NiCr), Haynes alloy, zinc, an oxide, nitride, or oxynitride of any of these (e.g., $Ni_xTi_yO_z$), or other suitable material(s). For example, one of these layers may be of or include zinc oxide instead of NiTi (and/or an oxide thereof).

The use of, for example, NiTi and/or $Ni_xTi_yO_z$ in these layers allows durability and/or visible transmission of a coated article to be improved in certain example instances. In certain example embodiments, even a fully oxidized layer of NiCrOx may have a relatively high residual absorption, due to the absorption of CrOx, which is k(550 nm)=0.033942. However, it has advantageously been found that because TiOx has a significantly lower absorption than CrOx, in certain example embodiments the inclusion of TiOx in a barrier layer may result in higher visible transmission of a coated article. For example, the absorption of TiOx k at 550 nm is 0.004806, which is almost $\frac{1}{10}^{th}$ of the absorption of CrOx. Therefore, when a metal or metal oxide with an absorption lower than that of CrOx is used in a barrier layer, the visible transmission of the coated article may be improved.

However, in certain example embodiments, a barrier layer comprising TiOx may not sufficiently adhere to an IR reflecting layer. Thus, if a barrier layer consisting only of TiOx is used, the durability of a coated article may suffer. It has advantageously been found, though, that by using an alloy including a material that does adhere well to IR reflecting layers, with Ti and/or TiOx, the durability of the coated article will not be as compromised by the substitution of Ti and/or TiOx (or any material with a relatively low absorption) for Cr and/or CrOx. Advantageously, Ni is thought to adhere well to IR reflecting layers. Thus, the use of a barrier layer including Ni and Ti, as well as oxides and/or nitrides thereof, may advantageously result in a coated article that has an improved visible transmission and adequate durability.

Contact layers 7 and 11 (e.g., of or including Ni and/or Ti) may or may not be continuous in different embodiments of this invention across the entire IR reflecting layer. In certain example embodiments, one or both of the NiTi layers 7, 11 includes from about 1-50% Ni, and from about 50-99% Ti. An example is 80% Ti and 20% Ni. In certain example embodiments, the layer comprising $Ni_xTi_y$ may be fully and/or partially oxidized. This oxidation may occur as the layer is deposited, or may be due to processes performed after the deposition of the contact layer; for example, from the deposition of subsequent layers in the presence of oxygen, from heat treatment, etc.

However, the Ni and Ti may still be present in the same ratio as discussed above, regardless of the presence of oxygen. For example, even in a layer comprising nickel titanium oxide, the ratio of Ni to Ti may still be from about 1:99 to 50:50 (percentages and ratios of $Ni_xTi_y$ given by weight).

As mentioned above, the $Ni_xTi_y$ and/or $Ni_xTi_yO_z$ layer(s) 7 and/or 11 may be fully oxidized in certain embodiments of this invention (e.g., fully stoichiometric), or alternatively may only be partially oxidized (e.g., substoichiometric) (before and/or after optional HT). In other cases, layers 7 and/or 11 may be deposited as metallic layers, and may be fully or partially oxidized during post-deposition processes, such as the deposition of subsequent layers in the presence of oxygen, heat treatment, and the like. In certain instances, the $Ni_xTi_y$ and/or $Ni_xTi_yO_z$ layer 7 and/or 11 may be at least about 50% oxidized.

Contact layer(s) 7 and/or 11 (e.g., of or including an oxide of Ni and/or Ti) may or may not be oxidation graded in different embodiments of this invention. As is known in the art, oxidation grading involves changing the degree of oxidation in the layer through the thickness of the layer so that, for example, a contact layer may be graded so as to be less oxidized at the contact interface with the immediately adjacent IR reflecting layer 9 than at a portion of the contact layer further or more/most distant from the immediately adjacent IR reflecting layer. Descriptions of various types of oxidation graded contact layers are set forth in U.S. Pat. No. 6,576,349, the disclosure of which is hereby incorporated herein by reference. Contact layer(s) 7, 11 (e.g., of or including an oxide of Ni and/or Ti) may or may not be continuous in different embodiments of this invention across the entire IR reflecting layer 9.

In other example embodiments, the contact layer underneath an IR reflecting layer (e.g., the lower contact layer 7) may be of or include zinc and/or an oxide thereof.

Optional dielectric layers 13 and/or 15 may be of or include silicon nitride (e.g., $Si_xN_y$) or any other suitable material in certain example embodiments of this invention such as titanium oxide, tin oxide, silicon oxynitride and/or silicon oxide. These layers may help with durability issues, and/or may also protect the underlying layers, and in some case, optionally for antireflective purposes.

Optional overcoat layer 16 including, for example, zirconium oxide may also be included. U.S. patent application Ser. No. 12/213,879, which is hereby incorporated by reference, discusses advantages associated with the use of zirconium oxide as an overcoat. In other example embodiments, the optional overcoat 16 may be of or include silicon nitride, silicon oxide, and/or silicon oxynitride. Optional overcoat 16 may also include other zirconium-containing compounds in still further example embodiments.

In certain example embodiments, the coated article illustrated in FIG. 1 may be used as a monolithic window with a low-E coating with a single IR reflecting layer. However, in other example embodiments, a coated article as described herein may be used with any number of IR reflecting layers and maybe combined with any number of other glass substrates to create a laminated and/or insulated glass unit. The coatings may also be used in connection with IGU, VIG, automotive glass, and any other applications, according to different example embodiments.

Figure 2:
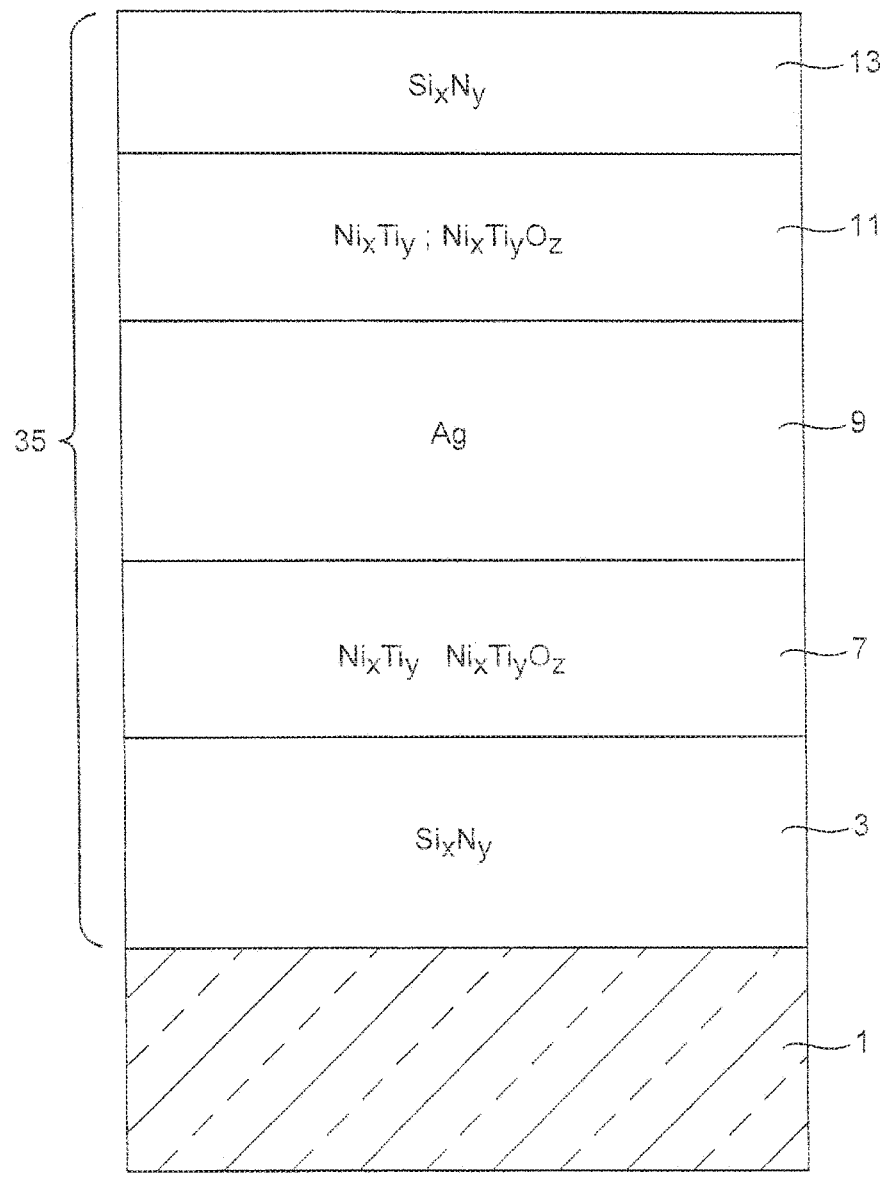
FIG. 2 is a cross-sectional view of a coated article according to another example embodiment of this invention.

FIG. 2 is another example embodiment of a low-E coating 35' with a single IR reflecting layer. In the FIG. 2 embodiment, the $Ni_xTi_yO_z$-based layer is used as the upper and lower contact layers. Further, in FIG. 2, a silicon nitride-based layer is used as dielectric layer 3, while dielectric layer 5 is omitted. Dielectric layer 13 comprises silicon nitride, and the overcoat layer 16 is omitted, inasmuch as the dielectric layer 13 also may help serve overcoat layer purposes (such as, for example, by protecting the underlying layers) in the FIG. 2 embodiment. In certain exemplary embodiments, the coated article of FIG. 2 may have improved visible transmission, and may also have improved and/or substantially unaffected chemical and mechanical durability.

TABLE 1

Example Materials/Thicknesses; FIG. 2 Embodiment

| Layer<br>Glass (1-10 mm thick) | Preferred Range<br>(Å) | Most Preferred<br>(Å) | Ex.<br>(Å) |
|---|---|---|---|
| $Si_xN_y$ (layer 3) | 70-1200 Å | 250-400 Å | 382 Å |
| $Ni_xTi_yO_z$ (layer 7) | 5-200 Å | 10-50 Å | 15 Å |
| Ag (layer 9) | 20-700 Å | 30-300 Å | 120 Å |
| $Ni_xTi_yO_z$ (layer 11) | 5-200 Å | 10-45 Å | 15 Å |
| $Si_xN_y$ (layer 14) | 40-1200 Å | 250-400 Å | 330 Å |

TABLE 2

Example Characteristics; FIG. 2 Embodiment

| Description | Y | L* | a* | b* |
|---|---|---|---|---|
| As-coated (Transmission) | 66.16 | 85.08 | −1.59 | −3.44 |
| As-coated (Glass side) | 6.79 | 31.32 | 3.53 | 6.71 |
| As-coated (Film side) | 5.62 | 28.43 | 3.73 | −7.18 |
| After HT (Transmission) | 69.18 | 86.59 | −2.6 | −3.89 |
| After HT (Glass side) | 6.44 | 30.5 | 7.25 | 8.14 |
| After HT (Film side) | 5.74 | 28.74 | 5.92 | −4.9 |

The FIG. 2 example embodiment may have a sheet resistance of approximately 11.15 ohms/square in certain example implementations. However, as is known by those skilled in the art, sheet resistance and/or emissivity may be adjusted by, among other things, adjusting the thickness of the Ag-based layer.

In other words, in certain example embodiments, a monolithic coated article having one IR reflecting layer may have a visible transmission of at least about 55%, preferably at least about 60%, and still more preferably at least about 65%, and sometimes at least about 67%, as deposited. After heat treatment, the monolithic coated article may have a higher visible transmission, e.g., of at least about 60%, more preferably from about 65%, with an example transmission of about 70%.

As coated, the article may have a glass side a* value of from about 0 to 5, more preferably from about 1 to 4, with an example being around 3.5 in certain example embodiments. As coated, the article may have a glass side b* value of from about 0 to 10, more preferably from about 1 to 7, with an example being around 6.7 in certain example embodiments. In some cases, an article may have a film side a* value of from about 0 to 5, more preferably from about 1 to 4, with an example being around 3.7, as coated. In other example embodiments, an article may have a film side b* value of from about −10 to 1, more preferably from about −8 to −2, with an example being about −7.18.

After heat treatment (expressed as "HT" in Table 2), the article may have a glass side a* value of from about 0 to 10, more preferably from about 1 to 8, with an example being around 7.25 in certain example embodiments. As coated, the article may have a glass side b* value of from about 0 to 10, more preferably from about 1 to 9, with an example being around 8.14 in certain example embodiments. In some cases, an article may have a film side a* value of from about 0 to 8, more preferably from about 1 to 6, with an example being around 5.92, as coated. In other example embodiments, an article may have a film side b* value of from about −8 to 1, more preferably from about −6 to −2, with an example being about −4.9.

Figure 3:
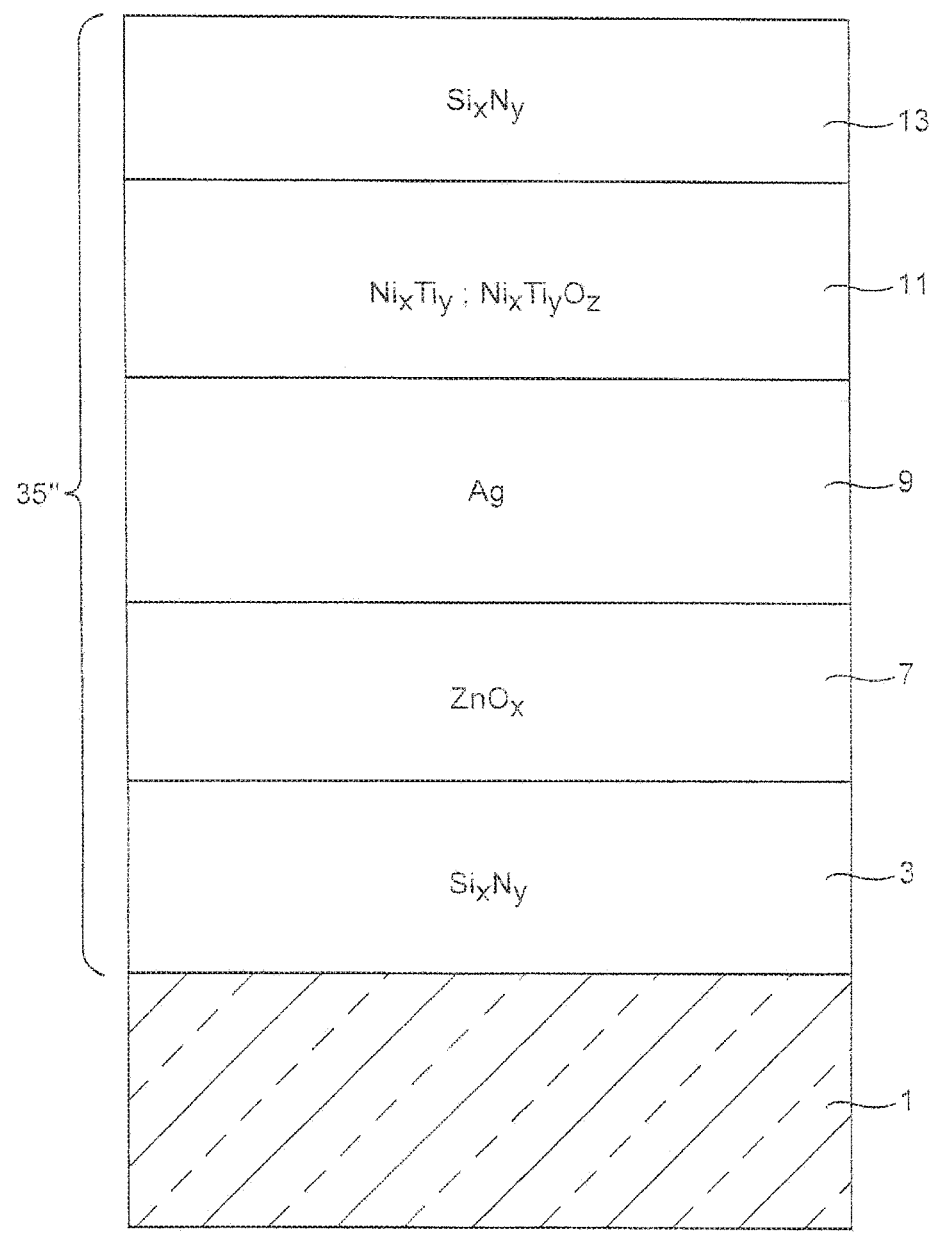
FIG. 3 is a cross-sectional view of a coated article according to a further embodiment of this invention.

FIG. 3 is another example embodiment of a low-E coating 35" with a single IR reflecting layer. FIG. 3 is similar to the FIG. 1 and FIG. 2 embodiments, but in the FIG. 3 embodiment, the $Ni_xTi_yO_z$-based layer is used as the upper contact layer 11, while a zinc oxide-based layer is used as the lower contact layer 7. Further, in FIG. 3, a silicon nitride-based layer is used as dielectric layer 3, while dielectric layer 5 is omitted. Dielectric layer 13 comprises silicon nitride in the FIG. 3 embodiment. In certain exemplary embodiments, the coated article of FIG. 3 may have improved and/or unaffected chemical and mechanical durability, and may also have increased visible transmission.

Figure 4:
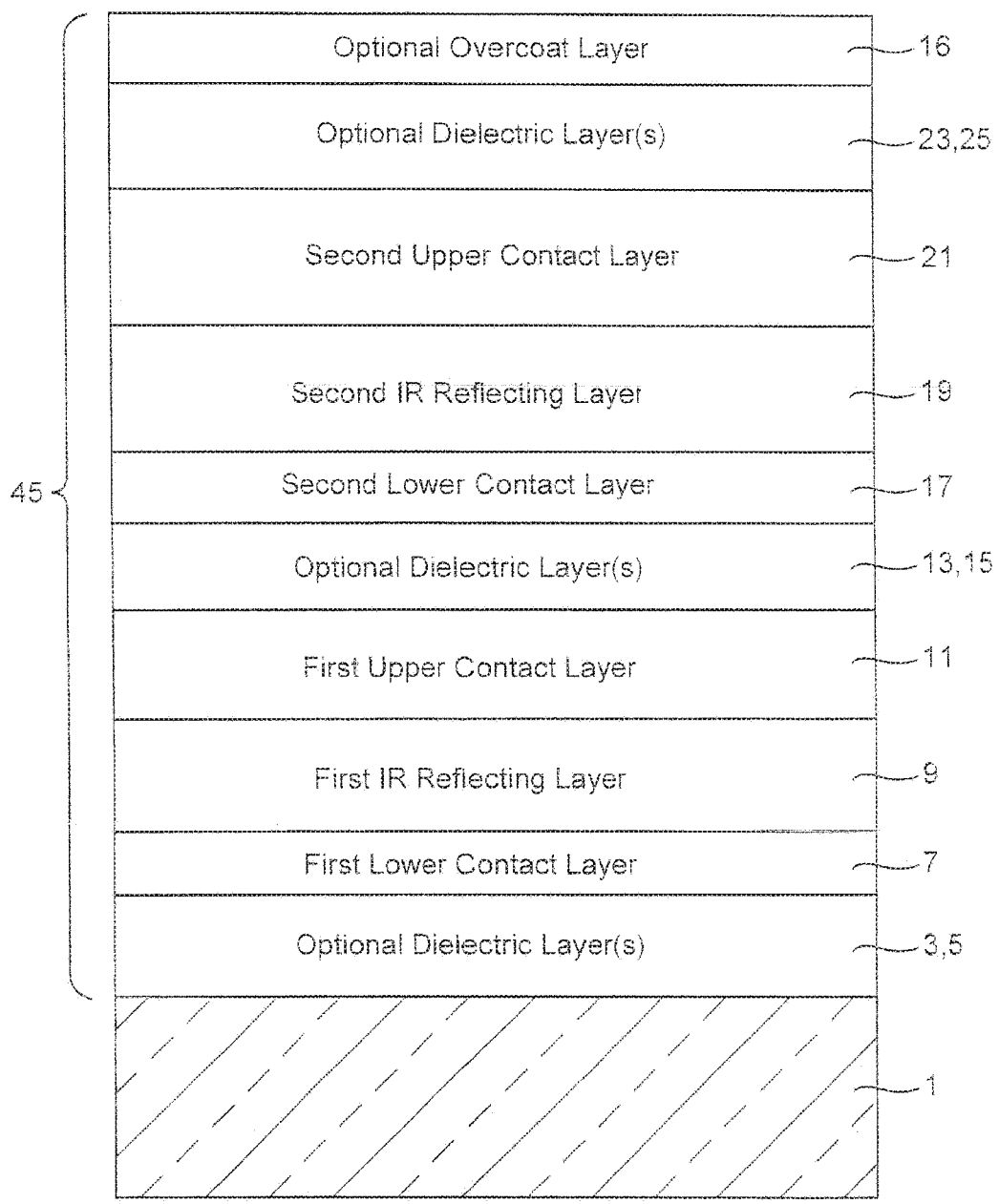
FIG. 4 is a cross-sectional view of a coated article according to still further example embodiments of this invention.

FIG. 4 is a cross-sectional view of a coated article according to an example embodiment of this invention. In certain example embodiments, the coated article illustrated in FIG. 4 may be used as a monolithic window with a low-E coating with double IR reflecting layers. The coated article includes glass substrate 1 (e.g., clear, green, bronze, or blue-green glass substrate from about 1.0 to 10.0 mm thick, more preferably from about 1.0 mm to 6.0 mm thick), and a multi-layer coating (or layer system) provided on the substrate either directly or indirectly. Similarly to FIG. 1, coating 45 of FIG. 4 includes optional dielectric layer(s) 3 and/or 5, first lower contact layer 7, first IR reflecting layer 9 including or of silver, gold, or the like, first upper contact layer 11 of or including an oxide of nickel titanium (e.g., $Ni_xTi_yO_z$), optional dielectric layer(s) 13 and/or 15 (e.g., of or including silicon nitride), second lower contact layer 17, second IR reflecting layer 19, second upper contact layer 21, optional dielectric layers 23 and/or 25, and optional dielectric layer 16 of or including a material such as silicon nitride, silicon oxynitride, zirconium oxide, zirconium oxynitride, or zirconium silicon oxynitride which may in certain example instances be a protective overcoat. Other layers and/or materials may also be provided in certain example embodiments of this invention, and it is also possible that certain layers may be removed or split in certain example instances.

In certain example embodiments, only one of the contact layers 7, 11, 17, and 21 may comprise nickel titanium and/or an oxide and/or nitride thereof. In further example embodiments, the upper contact layers may be of or include $Ni_xTi_y$ and/or $Ni_xTi_yO_z$, while the lower contact layers may be of or include oxides and/or nitrides of zinc, nickel, chromium, titanium, and/or a combination of these materials. However, in other example embodiments, more than one, or even all of the contact layers, may be of or include nickel titanium and/or oxides and/or nitrides thereof.

Figure 5:
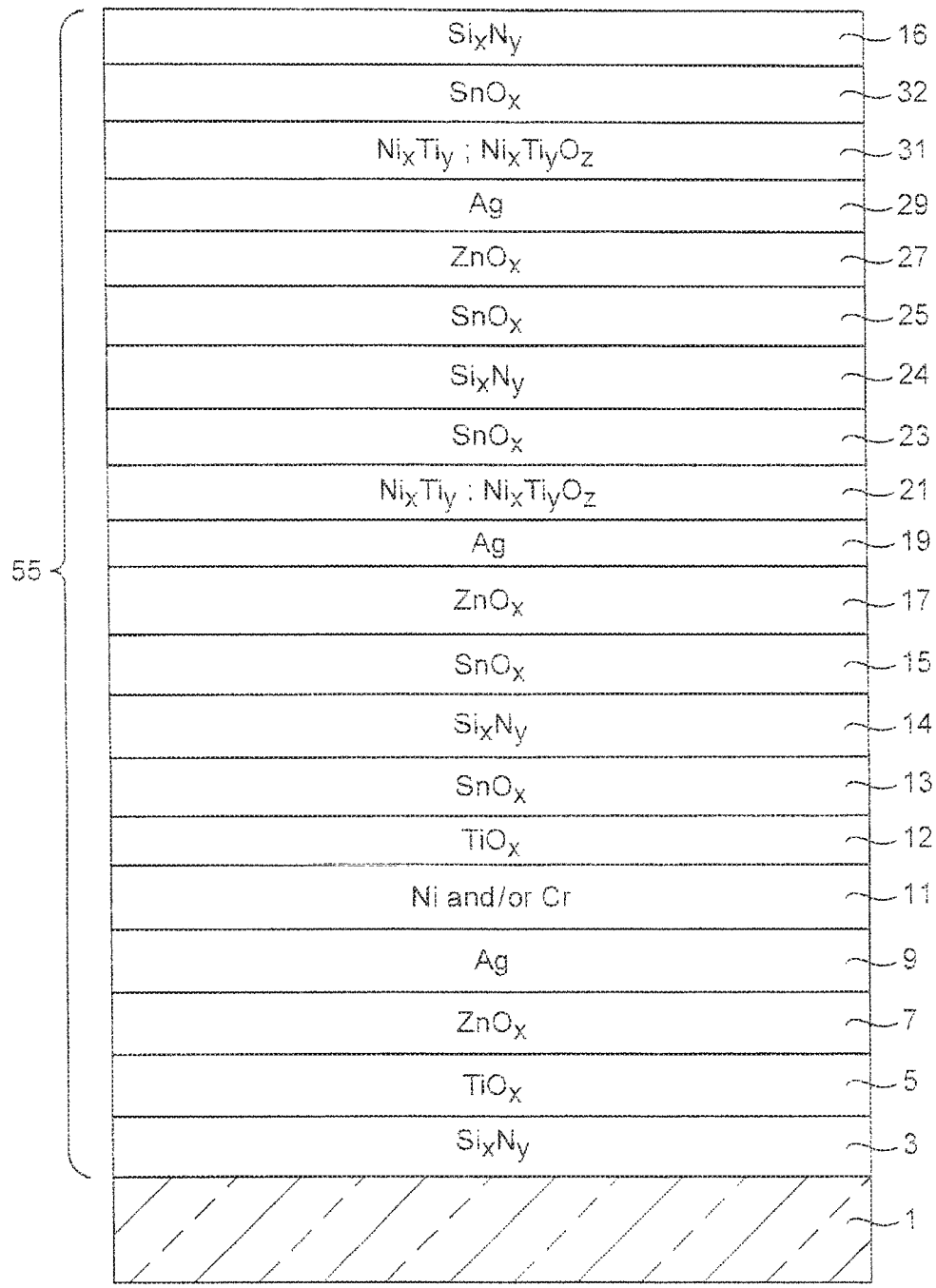
FIG. 5 is a cross-sectional view of a coated article according to still another example embodiment of this invention.

FIG. 5 is a cross-sectional view of a coated article according to a further example embodiment of this invention. In certain example embodiments, the coated article illustrated in FIG. 5 may include three IR reflecting layers (e.g., a triple silver layer stack). The coated article includes glass substrate 1 (e.g., clear, green, bronze, or blue-green glass substrate from about 1.0 to 10.0 mm thick, more preferably from about 1.0 mm to 6.0 mm thick), and a multi-layer coating 55 (or layer system) provided on the substrate either directly or indirectly.

In certain example embodiments, coating 55 of FIG. 5 may comprise optional dielectric layer 3 of or including silicon nitride, optional dielectric layer 5 of or including titanium oxide, lower contact layer 7 of or including an oxide of zinc, IR reflecting layer 9 of or including silver, upper contact layer 11 of or including Ni and/or Cr, or an oxide thereof, optional dielectric layer 12 of or including titanium oxide, optional dielectric layer 13 of or including tin oxide, dielectric layer 14 of or including silicon nitride (or some other silicon-inclusive or other material), dielectric layer 15, of or including tin oxide, second lower contact layer 17 of or including zinc oxide, second IR reflecting layer 19 of or including silver, second upper contact layer 21 of or including nickel and/or titanium or an oxide thereof, dielectric layer 23 of or including tin oxide, dielectric layer 24 of or including silicon nitride (or some other silicon-inclusive or other material), dielectric 24 of or including tin oxide, third lower contact layer 27 of or including zinc oxide, third IR reflecting layer 29 of or including silver, third upper contact layer 31 of or including Ni and/or Ti or an oxide thereof, dielectric layer 32 of or including tin oxide, and dielectric layer 16 of or including silicon nitride, which may in certain example instances be a protective overcoat. Other layers and/or materials may also be provided in certain example embodiments of this invention, and it is also possible that certain layers may be removed or split in certain example instances. Further, in other example embodiments, one or more of upper contact layers 11, 21, and 31 may comprise nickel chromium and/or an oxide thereof, rather than an oxide of nickel titanium. Moreover, any of layers 7, 11, 17, 21, 27, and/or 31 may be of or include nickel, titanium, chromium, zinc, combinations/alloys thereof, and may further include oxygen and/or nitrogen. Thus, any or all of upper contact layers 11, 21, and 31 may be Ni and/or Ti inclusive layers (e.g., layers comprising NiTiOx) in different embodiments of this invention.

The layers comprising NiTiOx may help provide high performance coatings, inasmuch as the NiTiOx may help to lower overall emissivity while maintaining a good silver quality. Furthermore, as alluded to above, the Ni in such layers may help with durability issues while the Ti may help with transmission. It is noted that certain example embodiments may replace the NiTiOx with Ti metal or TiOx.

In certain example embodiments, the layers comprising NiTiOx may be deposited slightly oxided or metal and then become substantially fully oxided later via subsequent processing (e.g., during sputtering of subsequently deposited layers). The NiTiOx also may be graded in certain example embodiments as it is deposited.

EXAMPLE THICKNESSES

TABLE 3

Example Materials/Thicknesses; FIG. 5 Embodiment (Annealed)

| Layer<br>Glass (1-10 mm thick) | Preferred Range (Å) | Most Preferred (Å) | Ex. (Å) |
|---|---|---|---|
| $Si_xN_y$ (layer 3) | 70-1200 Å | 200-350 Å | 294 Å |
| $TiO_x$ (layer 5) | 10-300 Å | 100-140 Å | 116 Å |
| $ZnO_x$ (layer 7) | 10-110 Å | 40-80 Å | 60 Å |
| Ag (layer 9) | 10-200 Å | 100-160 Å | 120 Å |
| $Ni_xTi_yO_z$ (layer 11) | 10-100 Å | 15-40 Å | 25 Å |
| $TiO_x$ (layer 12) | 10-150 Å | 40-60 Å | 50 Å |
| $SnO_x$ (layer 13) | 70-1200 Å | 200-700 Å | 270 Å |
| $Si_xN_y$ (layer 14) | 10-300 Å | 100-140 Å | 110 Å |

TABLE 3-continued

Example Materials/Thicknesses; FIG. 5 Embodiment (Annealed)

| Layer<br>Glass (1-10 mm thick) | Preferred Range (Å) | Most Preferred (Å) | Ex. 5 (Å) |
|---|---|---|---|
| SnO$_x$ (layer 15) | 70 to 1200 Å | 100-200 Å | 163 Å |
| ZnOx (layer 17) | 15-115 Å | 50-150 Å | 130 Å |
| Ag (layer 19) | 10-300 Å | 100-145 Å | 130 Å |
| NiTiOx (layer 21) | 10-150 Å | 20-50 Å | 25 Å |
| SnOx (layer 23) | 70-1200 Å | 300-700 Å | 501 Å |
| SixNy (layer 24) | 10-300 Å | 60-140 Å | 100 Å |
| SnOx (layer 25) | 10-300 Å | 100-200 Å | 150 Å |
| ZnOx (layer 27) | 10-110 Å | 40-80 Å | 60 Å |
| Ag (layer 29) | 10-300 Å | 120-180 Å | 161 Å |
| NiTiOx (layer 31) | 10-150 Å | 15-50 Å | 25 Å |
| SnOx (layer 32) | 10-300 Å | 100-210 Å | 155 Å |
| SixNy (layer 16) | 70-1200 Å | 200-300 Å | 256 Å |

In certain example embodiments, the top Ag-based layer is the thickest in the layer stack. This arrangement has been found to help improve emissivity of the coating. Also, in certain example embodiments, the middle Ag-based layer is thinner than the top Ag-based layer, which has been found to help maintain the improved emissivity, while also itself improving off-axis color stability and helping to provide high visible transmission.

It surprisingly and unexpectedly has been found that the introduction of the second layer comprising titanium oxide 12 in the lower middle dielectric layer stack improved the quality of the underlying Ag-based layer 9. This is believed to be a result of less tin oxide from layer 13 interfering with the underlying first contact layer 11 directly adjacent to the first Ag-based layer 9.

Moreover, in certain example laminated embodiments of this invention, coated articles herein that have been optionally heat treated to an extent sufficient for heat strengthening or tempering, and that have been coupled to another glass substrate to form an IG unit, may have the following IG unit optical/solar characteristics.

In the context of IG units, for example, the use of NiTiOx advantageously allows for higher LSG values to be obtained. For instance, in certain example instances, an LSG of 2.15 or higher is possible, whereas an LSG value of around 2.1 or lower is possible if only NiCr based layers are used without NiTiOx inclusive layers. As will be appreciated by those skilled in the art, a high LSG value is advantageous because it is indicative of high visible transmission coupled with low SHGC, thus keeping heat out and letting light in.

The FIG. 5 example embodiment is particularly well suited for use in an annealed product. Modifications may or may not be made for heat treatable embodiments. For example, in heat treatable example embodiments one or both of the layers 5 and/or 12 including TiOx may be removed. As another example, in the heat treatable coating, some or all of the layers 14, 24, and 16 comprising SiN may be made more metallic than in the annealed counterpart. Still further, some or all of the layers comprising NiTiOx may be replaced with layers comprising NiCr or an oxide thereof. The table below shows example materials and thicknesses for a heat treatable coated article similar to that shown in FIG. 5, but modified in view of the foregoing.

TABLE 4

Example Materials/Thicknesses; FIG. 5 Embodiment Modified (Heat Treatable)

| Layer | Preferred Range (nm) | More Preferred (nm) | Example (nm) |
|---|---|---|---|
| SiN | 25.9-38.9 | 29.2-35.6 | 32.4 |
| ZnO | 5.6-8.4 | 6.3-7.7 | 7 |
| Ag | 10.2-15.2 | 11.4-14 | 12.7 |
| NiCrOx | 2.4-3.6 | 2.7-3.3 | 3 |
| SnO | 35.9-53.9 | 40.4-49.4 | 44.9 |
| SiN | 8-12 | 9-11 | 10 |
| SnO | 12.2-18.2 | 13.7-16.7 | 15.2 |
| ZnO | 5.2-7.8 | 5.9-7.2 | 6.5 |
| Ag | 11.2-16.8 | 12.6-15.4 | 14 |
| NiTiOx | 2.4-3.6 | 2.7-3.3 | 3 |
| SnO | 36.6-55 | 41.2-50.4 | 45.8 |
| SiN | 8-12 | 9-11 | 10 |
| SnO | 12-18 | 13.5-16.5 | 15 |
| ZnO | 5.2-7.8 | 5.9-7.2 | 6.5 |
| Ag | 15.1-22.7 | 17-20.8 | 18.9 |
| NiCrOx | 2.4-3.6 | 2.7-3.3 | 3 |
| SnO | 11.2-16.8 | 12.6-15.4 | 14 |
| SiN | 23.4-35.2 | 26.4-32.2 | 29.3 |

Furthermore, in heat treated example embodiments, one or more "glue" layers comprising SnO may be reduced in thickness and/or removed completely. In such cases, it may be desirable to increase the thickness of the underlying layer(s) comprising SnO. For instance, layers 15 and/or 25 may have a reduced thickness (e.g., from about 15 nm to about 10 nm) and/or may be removed completely. Correspondingly, layers 13 and/or 23 may have an increased thickness. The amount of the increased thickness may be about 8-12 nm. Thus, in certain example embodiments, layer 15 may have a reduce thickness of about 8-12 nm, more preferably 9-11 nm, and sometimes about 10 nm, while the layer 13 may have an increased thickness of about 40.9-61.3 nm, more preferably 46-56.2 nm, and sometimes about 51.1 nm. Similarly, layer 25 may have a reduce thickness of about 8-12 nm, more preferably 9-11 nm, and sometimes about 10 nm, while the layer 23 may have an increased thickness of about 40.6-61 nm, more preferably 45.7-55.9 nm, and sometimes about 50.8 nm. In addition, or in the alterantive, one of more of the middle dielectric layer stacks may include a layer comprising ZnSnO This layer may be formed, for example, by co-sputtering (e.g., from Zn or ZnO targets and Sn or SnO targets). The ZnSnO inclusive layers may be provided in place of or in addition to the layers comprising SnO on one or both sides thereof.

The table below includes performance data for the FIG. 5 example embodiment in the annealed state, as well as a modification to the FIG. 5 example embodiment in which the layers 5 and 12 comprising TiOx are omitted and where the coated article is heat treated when disposed on 6.0 mm clear float glass, e.g., in accordance with the table above. Of course, different thickness substrates and/or different composition substrates may be used in different embodiments. It will be appreciated that the preferred ranges may be the same or similar for annealed and heat treated embodiments. It also will be appreciated that the performance will be approximately comparable for annealed and heat treated embodiments, but with heat treated embodiments out-performing annealed embodiments in terms of transmission.

TABLE 5

Example Performance Characteristics for Monolithic Coated Articles

| Parameter | Preferred | More Preferred | Example | Annealed Sample | HT Sample |
|---|---|---|---|---|---|
| Transmittance | | | | | |
| Y (%) | >=55 | >=65 | 68.9 | 67.7 | 68.7 |
| T a* | −7.0--3.1 | −6--4.1 | −5.1 | −6.1 | −5.6 |
| T b* | −1.3-2.7 | −0.3-1.7 | 0.7 | 4.5 | 6.0 |
| T L* | 84.9-88.0 | 85.7-87.3 | 86.5 | 85.9 | 86.4 |
| Film Side Reflectance | | | | | |
| Y (%) | 1.6-8.6 | 3.3-6.9 | 4.9 | 8.5 | 7.1 |
| Rf a* | −2.0-6.0 | −0.08-3.9 | 1.9 | −6.0 | −1.0 |
| Rf b* | −16.0--8.1 | −14.0--10.1 | −12.1 | −2.9 | −5.1 |
| Rf L* | 16.4-36.4 | 21.4-31.5 | 26.4 | 35.1 | 32.0 |
| Glass Side Reflectance | | | | | |
| Y (%) | 4.3-10.7 | 5.9-9.2 | 7.4 | 5.5 | 4.5 |
| Rg a* | −5.1-0.9 | −3.6--0.7 | −2.1 | −3.6 | −1.0 |
| Rg b* | −11.3--3.4 | −9.3--5.4 | −7.3 | −1.4 | −4.5 |
| Rg L* | 25.7-39.7 | 29.2-36.2 | 32.7 | 28.0 | 25.2 |
| Glass Side Reflectance 45° | | | | | |
| Y (%) | 5.4-12.8 | 7.3-11.0 | 9.0 | | |
| Rg a* | −3.8-2.1 | −2.3-0.7 | −0.9 | | |
| Rg b* | −4.1-3.8 | −2.1-1.9 | −0.1 | | |
| Rg L* | 28.9-43.0 | 32.4-39.5 | 36.0 | | |
| Sheet Resistance (ohms/sq) | 1.1-1.9 | 1.3-1.7 | 1.5 | 1.2 | 1.0 |
| Normal Emissivity (%) | 1-4 | 1-3 | 2.00 | | |

The table below includes performance data for an IG unit including a coated article as shown in the FIG. 5 example embodiment in the annealed state, as well as a modification to the FIG. 5 example embodiment in which the layers 5 and 12 comprising TiOx are omitted and where the coated article is heat treated, e.g., where the coating is disposed on surface 2 of the IG unit. The examples in the table below include first and second 6.0 mm substrates separated by a 12 mm gap filled with air. Of course, different thickness substrates, different composition substrates, different gap sizes, different gases, etc., may be used in different embodiments. It will be appreciated that the preferred ranges may be the same or similar for annealed and heat treated embodiments. It also will be appreciated that the performance will be approximately comparable for annealed and heat treated embodiments, but with heat treated embodiments out-performing annealed embodiments in terms of transmission.

TABLE 6

Example Performance Characteristics for IG Units

| Parameter | Preferred | More Preferred | Example | Annealed Sample | HT Sample |
|---|---|---|---|---|---|
| $T_{vis}$ (or TY) (%) | >=55 | >=60 | 61.6 | 60.7 | 61.6 |
| $T_{uv}$ (%) | <=10 | <=4 | 4.7 | 4.6 | 6.0 |
| $T_{sol}$ (%) | <=30 | <=23 | 23.6 | 23.2 | 22.9 |
| $R_{sol}$ (%) | <=50 | <=40 | 38.6 | 38.6 | 39.4 |
| SHGC | <=30 | <=27 | 27.4 | 27.1 | 26.8 |
| U-Value | <=1.8 | <=1.63 | 0.290 | 0.286 | 0.285 |
| LSG | >=2.10 | >=2.15 (e.g., 2.20, 2.26, 2.33, etc.) | 2.25 | 2.24 | 2.30 |

In certain example embodiments, the nickel titanium-based layer may be deposited by sputtering from a metallic target. In some cases, the target may comprise 20% nickel and 80% titanium by weight. In other example embodiments, the metallic target may comprise 50% nickel and 50% titanium by weight. A metallic sputtering target of or including nickel and titanium may include from about 1 to 50% Ni (and all subranges therebetween), more preferably from about 2 to 50% Ni (and all subranges therebetween), and most preferably from about 5 to 20% Ni (and all subranges therebetween), in certain example embodiments (all percentages being weight %). The metallic sputtering target of or including nickel and titanium may further comprise from about 50 to 99% Ti (and all subranges therebetween), more preferably from about 50 to 98% Ti (and all subranges therebetween), and most preferably from about 80 to 95% Ti (and all subranges therebetween), in certain example embodiments (all percentages being weight %).

In still further example embodiments, the nickel-titanium based layer may be deposited by more than one sputtering target. In some cases, there may be a metallic Ni target and a metallic Ti target. In certain examples, the layer based on Ni and/or Ti may be sputter deposited in the presence of one or more noble and/or reactive gases. In certain exemplary embodiments, the Ni and Ti may be deposited in the presence of at least argon and oxygen. In other example embodiments, one or more of the targets may be ceramic. For example, the barrier layer may be deposited using at least a metallic target comprising nickel, and a ceramic target comprising an oxide of titanium, and/or a metallic target comprising titanium and a ceramic target comprising an oxide of nickel. Furthermore, in still further example embodiments, one, two, or more ceramic targets may be used to deposit a layer comprising an oxide of nickel titanium.

In certain example embodiments, only some contact layers may comprise Ni and/or Ti and/or oxides and nitrides thereof. In other example embodiments, other contact layers may comprise Ni and/or Cr, and/or oxides and nitrides thereof. In further example embodiments, other contact layers may comprise zinc and/or oxides thereof.

The use of a contact layer based on nickel titanium and/or an oxide thereof has advantageously been found to increase the mechanical and chemical durability of the coated article, without sacrificing optical properties, such that a single silver layer stack (e.g., a low-E coating comprising only one layer of silver) may be used in monolithic instances, on surface 1 and/or surface 2 of a glass substrate (e.g., the coating may face the interior or exterior). However this invention is not so limited, and a low-E coating including a $Ni_xTi_yO_z$ barrier layer may be used on any surface in any configuration, according to different example embodiments.

Although certain example embodiments have been described as relating to low-E coatings, the Ni and/or Ti inclusive layers described herein may be used in connection with different types of coatings.

Figure 6:
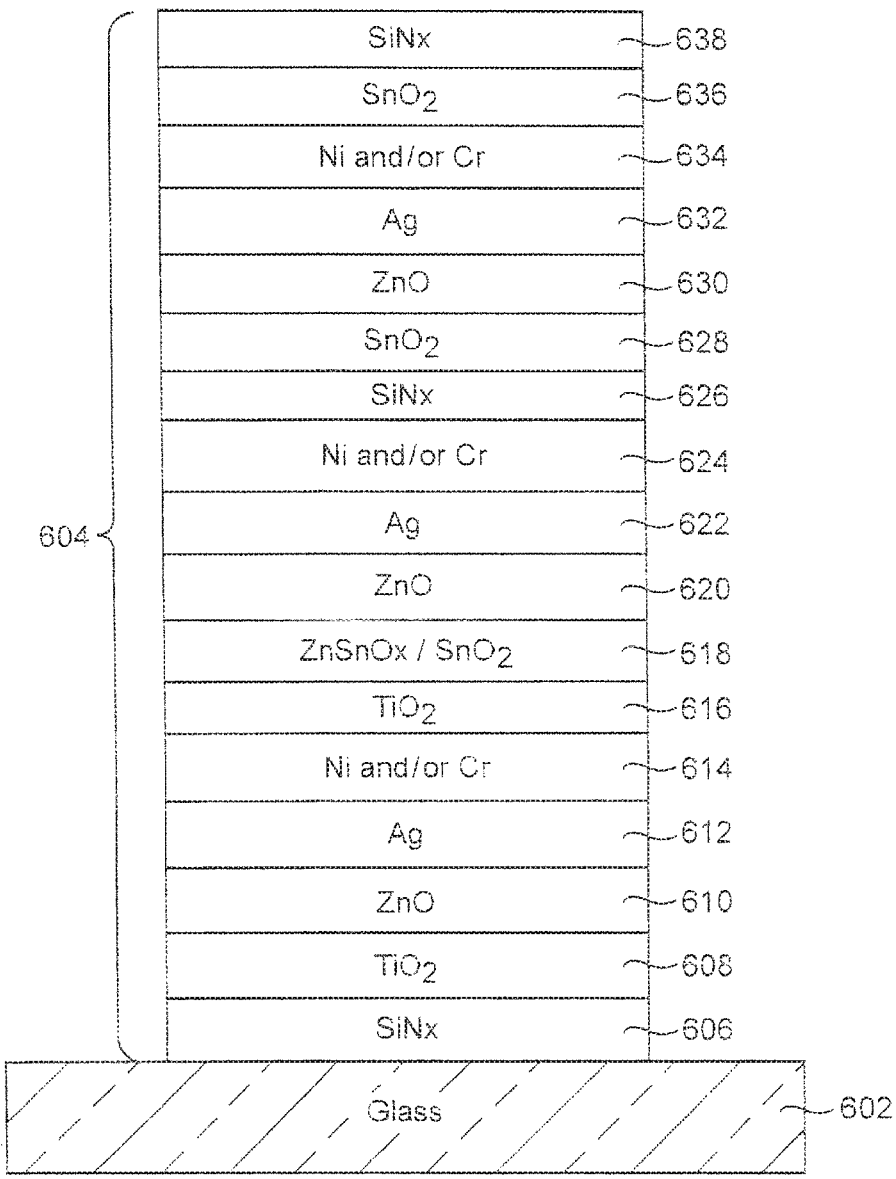
FIG. 6 is a detailed cross-sectional view of an example coated article in accordance with an example embodiment.
Figure 7:
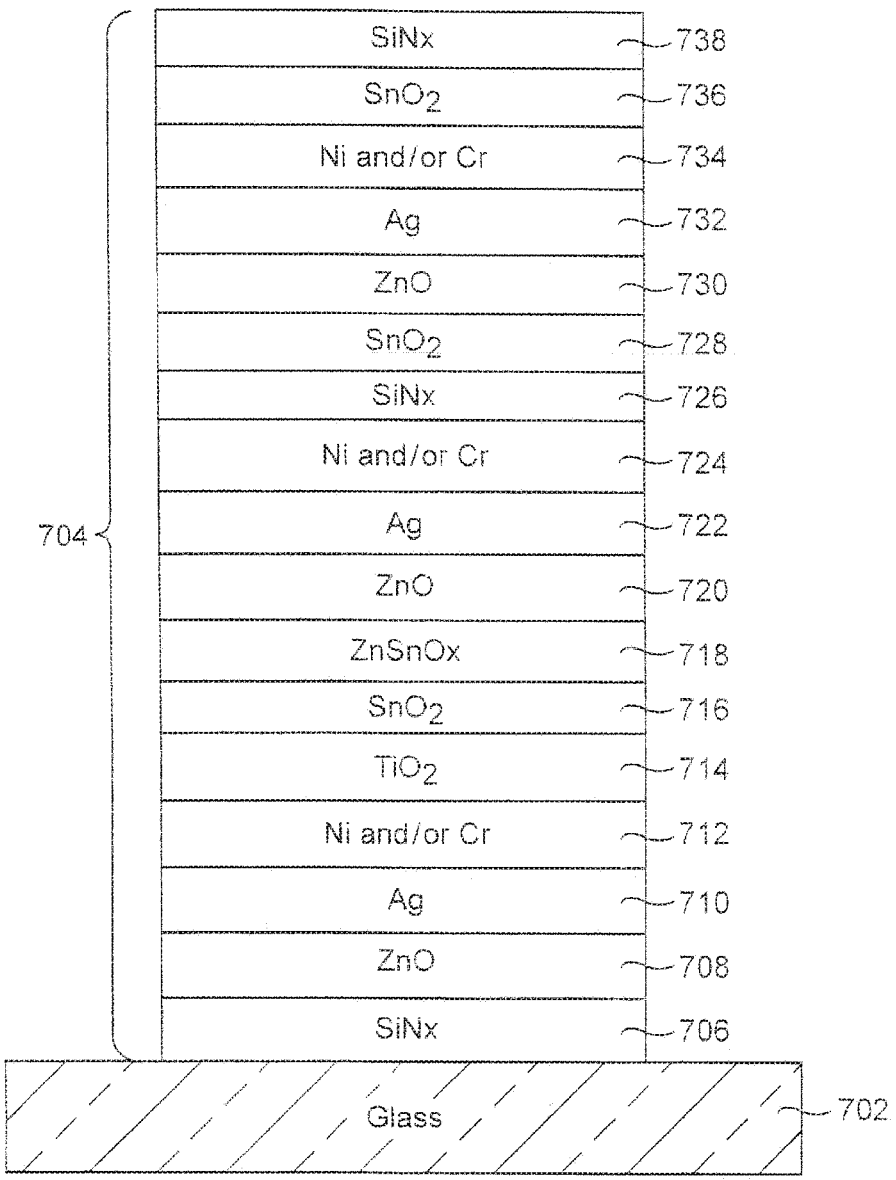
FIG. 7 is another detailed cross-sectional view of an example coated article in accordance with an example embodiment

FIGS. 6 and 7 are further detailed cross-sectional views of example coated articles in accordance with example embodiments of this invention. This FIG. 6 example is suitable for use in the as-deposited or annealed state. The glass substrate 602 in FIG. 6 supports a coating 604, which includes a silicon-inclusive base layer 606. Although the silicon-inclusive base layer 606 in FIG. 6 is show as being SiNx, different embodiments may include an oxided and/or nitrided silicon-inclusive layer 606. The silicon-inclusive base layer 606 supports a layer comprising titanium oxide 608 (e.g., $TiO_2$ or other suitable stoichiometry) and a layer comprising zinc oxide 610. The layer comprising zinc oxide 610 may be in contact with the first Ag-based layer 612. A first contact layer 614 comprising Ni and/or Cr may be provided over and contacting the first Ag-based layer 612 in certain example embodiments.

A second layer comprising titanium oxide 616 (e.g., $TiO_2$ or other suitable stoichiometry) is located over the first contact layer 614, and the second layer comprising titanium oxide 616 supports a mixed or graded layer 618 comprising ZnSnOx and tin oxide. In certain example embodiments, however, discrete layers comprising ZnSnOx and tin oxide may be provided in place of a mixed or graded layer. In embodiments where a mixed or graded layer 618 comprising ZnSnOx and tin oxide is provided, the layer may be graded so that there is more SnOx and less Zn closer to the underlying second layer comprising titanium oxide 616. This may be desirable if the ZnO/Ag/contact layer stack is repeated, as is shown in FIG. 6.

That is, in FIG. 6, the mixed or graded layer 618 comprising ZnSnOx and tin oxide supports, in order moving outwardly, a second layer comprising zinc oxide 620, a second Ag-based layer 622, and a second contact layer 624 comprising Ni and/or Cr.

A second silicon-inclusive layer 626 is provided above the second contact layer. Similar to the silicon-inclusive base layer 606, the second silicon-inclusive layer 626 is shown as comprising SiNx. However, different embodiments may include an oxided and/or nitrided second silicon-inclusive layer 626. The second silicon-inclusive layer 626 supports a layer comprising tin oxide 628, and the ZnO/Ag/contact layer stack may be repeated once again. That is, as shown in FIG. 6, the layer comprising tin oxide 628 supports a third layer comprising zinc oxide 630, a third Ag-based layer 632, and a third contact layer 634 comprising Ni and/or Cr. A second layer comprising tin oxide 636 may be provided over the third contact layer 634. A silicon-inclusive overcoat layer 238 may be provided as an outermost layer and, as with the other silicon-inclusive layers below, different embodiments may be oxided and/or nitrided. The FIG. 6 example shows an overcoat layer 638 comprising SiNx.

It will be appreciated that the contact layers described herein may be oxided in different embodiments of this invention. Thus, certain example embodiments may include NiCrOx contact layers over and contacting underlying Ag-based layers. It also will be appreciated that any or all of the NiCr and/or NiCrOx layers may be replaced with NiTi and/or NiTiOx.

Similar to as discussed above, it surprisingly and unexpectedly has been found that the introduction of the second layer comprising titanium oxide 616 in the lower middle dielectric layer stack improved the quality of the underlying Ag-based layer 612. This is believed to be a result of less $SnO_2$ from the combined layer 618 comprising ($ZnSnOx/SnO_2$) interfering with the underlying first contact layer 614 directly adjacent to the first Ag-based layer 612.

Example layer thicknesses for the layers shown in the FIG. 6 example embodiment are provided in the following table:

TABLE 7

Example Layer Stack for FIG. 6 Coated Article

| Layer | Preferred Thickness (nm) | More Preferred Thickness (nm) | Example Thickness (nm) |
| --- | --- | --- | --- |
| SiNx (206) | 5.5-9.3 | 6.6-8.2 | 7.4 |
| $TiO_2$ (208) | 3-5 | 3.6-4.4 | 4.0 |
| ZnO (210) | 6.6-11.2 | 8.0-9.8 | 8.9 |
| Ag (212) | 9-15 | 10.8-13.2 | 12.0 |
| NiCrOx (214) | 2.6-4.4 | 3.1-3.9 | 3.5 |
| $TiO_2$ (216) | 5.2-8.8 | 6.3-7.7 | 7.0 |
| ZnSnOx/$SnO_2$ (218) | 37.5-62.7 | 45.0-55.2 | 50.1 |
| ZnO (220) | 13.2-22.1 | 15.9-19.5 | 17.7 |
| Ag (222) | 9-15 | 10.8-13.2 | 12.0 |
| NiCrOx (224) | 2.6-4.4 | 3.1-3.9 | 3.5 |
| SiNx (226) | 7.5-12.5 | 9-11 | 10.0 |
| $SnO_2$ (228) | 19.8-33.1 | 23.8-29.2 | 26.5 |
| ZnO (230) | 19.9-33.3 | 23.9-29.3 | 26.6 |
| Ag (232) | 9.3-15.7 | 11.2-13.8 | 12.5 |
| NiCrOx (234) | 2.6 to 4.4 | 3.1-3.9 | 3.5 |
| $SnO_2$ (236) | 8.5-14.2 | 10.2-12.6 | 11.4 |
| SiNx(238) | 12.7-21.3 | 15.3-18.7 | 17.0 |

FIG. 7 is another detailed cross-sectional view of an example coated article in accordance with an example embodiment. The FIG. 7 example is suitable for use in the heat treated state. The FIG. 7 example is similar to the FIG. 6 example in that a substrate 702 supports a coating 704 with many of the same layers in much the same order. The differences between the FIG. 6 example embodiment and the FIG. 7 example embodiment include the lack of a first layer comprising titanium oxide below the first silver based layer 710, and the provision of separate layers comprising SnOx 716 and ZnSnOx 718 and in the lower middle dielectric, as opposed to a single mixed layer comprising (ZnSnOx/SnO2).

Thus, FIG. 7 includes, in order moving away from the substrate 702: a silicon-inclusive base 706, a first layer comprising zinc oxide 708 below a first Ag-based layer 710, a first contact layer 712 comprising Ni and/or Cr, a layer comprising titanium oxide 714 (e.g., TiO$_2$ or other suitable stoichiometry), separate layers comprising tin oxide 716 and ZnSnOx 718, a second layer comprising zinc oxide 720, a second Ag-based layer 722, a second contact layer 724 comprising Ni and/or Cr, a second silicon inclusive layer 726, a second layer comprising tin oxide 728, a third layer comprising zinc oxide 730, a third Ag-based layer 732, a third contact layer 734 comprising Ni and/or Cr, a third layer comprising tin oxide 736, and a silicon-inclusive overcoat layer 738. The options and/or alternatives described above, e.g., relating to the possible alloying of the Ag-based layers, the oxiding of the contact layers, the oxiding and/or nitriding of the silicon-inclusive layers, etc., are also options for the FIG. 7 example embodiment.

Example layer thicknesses for the layers shown in the FIG. 7 example embodiment are provided in the following table:

TABLE 8

Example Layer Stack for FIG. 7 Coated Article

| Layer | Preferred Thickness (nm) | More Preferred Thickness (nm) | Example Thickness (nm) |
| --- | --- | --- | --- |
| SiNx (306) | 8.4-14 | 10.0-12.32 | 11.2 |
| ZnO (308) | 8.2-13.8 | 9.9-12.1 | 11.0 |
| Ag (310) | 7.1-11.9 | 8.5-10.5 | 9.5 |
| NiCrOx (312) | 2.2-3.8 | 2.7-3.3 | 3.0 |
| TiO$_2$ (314) | 2.2-3.8 | 2.7-3.3 | 3.0 |
| SnO$_2$ (316) | | | |
| ZnSnOx (318) | 43.5-73 | 52.2-63.8 | 58.0 |
| ZnO (320) | 12-20 | 14.4-17.6 | 16.0 |
| Ag (322) | 9.6-16 | 11.5-14.1 | 12.8 |
| NiCrOx (324) | 2.2-3.8 | 2.7-3.3 | 3.0 |
| SiNx (326) | 8.3-13.9 | 10-12.3 | 11.1 |
| SnO$_2$ (328) | 27.7-46.3 | 33.3-40.7 | 37.0 |
| ZnO (330) | 15-25 | 18-22 | 20.0 |
| Ag (332) | 10.0-16.8 | 12.0-14.8 | 13.4 |
| NiCrOx (334) | 2.2-3.8 | 2.7-3.3 | 3.0 |
| SnO$_2$ (336) | 11.2-18.8 | 13.5-16.5 | 15.0 |
| SiNx (338) | 12.8-21.4 | 15.3-18.9 | 17.1 |

The FIG. 6 and FIG. 7 example embodiments may perform as per the table below, e.g., when disposed on 6.0 mm clear float glass. Of course, different thickness substrates and/or different composition substrates may be used in different embodiments. It will be appreciated that the preferred ranges may be the same or similar for annealed and heat treated embodiments. It also will be appreciated that the performance will be approximately comparable for annealed and heat treated embodiments, but with heat treated embodiments out-performing annealed embodiments in terms of transmission.

TABLE 9

Example Performance Characteristics for FIG. 6 and FIG. 7 Coated Articles

| Parameter | Preferred | More Preferred | Annealed Ex. 1 | Ex. 2 | HT Ex. 1 |
| --- | --- | --- | --- | --- | --- |
| Transmittance | | | | | |
| Y (%) | 61.6-70.8 | 64.0-68.5 | 65.6 | 66.2 | 70.7 |
| T a* | -6.7--2.7 | -5.7--3.7 | -3.4 | -4.7 | -3.8 |

TABLE 9-continued

Example Performance Characteristics for FIG. 6 and FIG. 7 Coated Articles

| Parameter | Preferred | More Preferred | Annealed Ex. 1 | Ex. 2 | HT Ex. 1 |
| --- | --- | --- | --- | --- | --- |
| T b* | 1.9-6.1 | 3.1-5.1 | 1.9 | 4.1 | 1.0 |
| T L* | 82.7-87.5 | 84.0-86.3 | 84.8 | 85.1 | 87.3 |
| Film Side Reflectance | | | | | |
| Y (%) | 3.8-6.0 | 4.4-5.4 | 3.3 | 4.9 | 4.25 |
| Rf a* | 8.8-12.8 | 9.8-11.8 | -1.7 | 10.8 | -3.9 |
| Rf b* | -12.6--8.6 | -11.6--9.6 | 4.1 | -10.6 | 1.4 |
| Rf L* | 23.9-29.4 | 24.9-27.9 | 21.1 | 26.4 | 24.5 |
| Glass Side Reflectance | | | | | |
| Y (%) | 6.4-10.4 | 7.4-9.4 | 5.2 | 8.4 | 5.81 |
| Rg a* | -3.4-+0.4 | -2.4--0.4 | -0.8 | -1.4 | -1.5 |
| Rg b* | -12.8--8.8 | -11.8--9.8 | -1.0 | -10.8 | -1.33 |
| Rg L* | 30.8-38.8 | 32.8-36.8 | 27.3 | 34.8 | 28.9 |
| Glass Side Reflectance 45° | | | | | |
| Y (%) | 7.4-10.8 | 8.5-10.7 | 7.5 | 9.6 | 8.3 |
| Rg a* | -3.0-+5.0 | -1.0-+3.0 | 0.7 | 1.0 | 0.35 |
| Rg b* | -13.4--1.4 | -10.4--4.4 | 1.5 | -7.4 | 1.5 |
| Rg L* | 33.1-41.1 | 35.1-39.1 | 32.8 | 37.1 | 34.6 |
| Sheet Resistance (ohms/sq) | 1-5 | 1.2-1.8 | 1.11 | 1.5 | 1.07 |
| Normal Emissivity (%) | 0.25-5.00 | 1.00-3.00 | | 2.00 | |

When the FIG. 6 and FIG. 7 example coated articles are incorporated in IG units, they may perform as shown in the following table. The annealed example in the table below includes a first ExtraClear substrate that is 6.0 mm thick and a second ExtraClear substrate that is 4 mm thick, with an air gap of 16 mm filled with 90% Ar gas. The heat treated examples have first and second substrates of 3 mm and 6 mm thick respectively, with 12 separations of 12 mm. Of course, different thickness substrates, different composition substrates, different gap sizes, different gases, etc., may be used in different embodiments. It will be appreciated that the preferred ranges may be the same or similar for annealed and heat treated embodiments. It also will be appreciated that the performance will be approximately comparable for annealed and heat treated embodiments, but with heat treated embodiments out-performing annealed embodiments in terms of transmission.

TABLE 10

Example Performance Characteristics for IG Units Based on FIG. 6 and FIG. 7 Examples

| Parameter | Preferred | More Preferred | AC Ex. 1 | HT Ex. 1 | Ex. 2 |
| --- | --- | --- | --- | --- | --- |
| Transmittance | | | | | |
| Y (%) | 56.1-64.3 | 58.1-62.2 | 60.1 | 63.9 | 62.0 |
| T a* | -7 to -3 | -6--4 | -5.0 | -4.11 | -5.45 |
| T b* | 2.1-6.1 | 3.1-5.1 | 4.1 | 0.17 | 0.16 |
| T L* | 79.7-84.1 | 80.8-83.0 | 81.9 | 83.9 | 82.9 |
| Outside Reflectance | | | | | |
| Y (%) | 8.9-15.6 | 10.0-14.5 | 12.1 | 10.5 | 10.3 |
| R out, a* | -4.7--0.7 | -3.7--1.7 | -2.7 | -3.25 | -3.75 |

TABLE 10-continued

Example Performance Characteristics for IG
Units Based on FIG. 6 and FIG. 7 Examples

| Parameter | Preferred | More Preferred | AC Ex. 1 | HT Ex. 1 | HT Ex. 2 |
|---|---|---|---|---|---|
| R out, b* | −10.8--−4.8 | −8.8--−6.8 | −7.8 | −0.04 | −0.06 |
| R out, L* | 34.4-48.4 | 37.9-44.9 | 41.4 | 38.8 | 38.4 |
| Inside Reflectance | | | | | |
| Y (%) | 8.3-16.3 | 10.3-14.3 | 12.2 | 11.8 | 11.5 |
| R in a* | 2.6-6.6 | 3.6-5.6 | 4.6 | −1.71 | −2.36 |
| R in b* | −7.4--−3.4 | −6.4--−4.4 | −5.4 | −1.30 | −1.30 |
| Rg L* | 36.7-46.3 | 38.3-44.7 | 41.5 | 40.9 | 40.4 |

The thermal performance of certain example IG units may be as follows, e.g., when the as-deposited coatings are provided on surface 2 of an IG unit having a 6 mm and 4 mm thick ExtraClear glass substrates and a 16 mm gap filled with 90% Ar:

TABLE 11

Example Thermal Performance Characteristics for
IG Units Based on FIG. 6 and FIG. 7 Examples

| Parameter NFRC 2001 | Preferred | More Preferred | Example |
|---|---|---|---|
| Visible Transmission (%) | >=50 | >=55 | 60.0 |
| Solar Transmission (%) | <=21-29 | <=23-27 | 25.0 |
| Solar $R_{out}$ Reflectance (%) | <=40-48 | <=42-46 | 44.0 |
| Solar Absorption (%) | <=27-35 | <=29-33 | 31.0 |
| SHGC (%) | <=23-31 | <=25-29 | 27.0 |
| $T_{uv}$ (%) | <=7-19 | <=10-16 | 13.0 |
| LSG (SHGC) | >=2.02-2.38 | >=2.12-2.30 | 2.22 |
| U-value (BTU/[h ft² F.])) | <=0.1-0.4 | <=0.1-0.3 | 0.194 |

The thermal characteristics of Examples 1 and 2 of the heat treated embodiment above may be as follows:

TABLE 12

| | Preferred | Example 1 | Example 2 |
|---|---|---|---|
| $T_{solar}$ | 18.7-31.3 | 25.69 | 24.40 |
| $R_{solar}(2)$ | 32.1-53.7 | 47.26 | 38.52 |
| $R_{solar}(3)$ | 31.6-52.8 | 46.38 | 37.96 |
| $T_{uv}$ | 6.7-11.3 | 9.74 | 8.31 |
| $T_{dw}$ | 34.8-58.2 | 47.48 | 45.58 |
| $U_{winter}$ (air) | 0.2-0.4 | 0.27 | 0.27 |
| $U_{summer}$ (air) | 0.2-0.4 | 0.29 | 0.29 |
| Emissivity (normal) | 0.01-0.05 | 0.020 | 0.020 |
| Emissivity (hemispherical) | 0.01-0.05 | 0.026 | 0.026 |
| SHGC (2) | 0.2-0.4 | 0.282 | 0.283 |
| SHGC (3) | 0.3-0.6 | 0.417 | 0.407 |
| SC (2) | 0.2-0.5 | 0.33 | 0.33 |
| SC (3) | 0.3-0.6 | 0.48 | 0.47 |
| RHG (2) | 52.5-87.5 | 70 | 70 |
| RHG (3) | 75-125 | 101 | 99 |
| LSG | 1.6-2.8 | 2.27 | 2.19 |

A coated article as described herein (e.g., see FIGS. 1-7) may or may not be heat-treated (e.g., tempered) in certain example embodiments. The terms "heat treatment" and "heat treating" as used herein mean heating the article to a temperature sufficient to achieve thermal tempering and/or heat strengthening of the glass inclusive article. This definition includes, for example, heating a coated article in an oven or furnace at a temperature of at least about 550 degrees C., more preferably at least about 580 degrees C., more preferably at least about 600 degrees C., more preferably at least about 620 degrees C., and most preferably at least about 650 degrees C. for a sufficient period to allow tempering and/or heat strengthening. This may be for at least about two minutes, or up to about 10 minutes, in certain example embodiments.

As indicated above, certain example embodiments may include a low-E coating supported by a glass substrate. This coated article may be used monolithically or laminated to another glass or other substrate. The coated article also may be built into an insulated glass (IG) unit. IG units generally comprise first and second substantially parallel spaced apart glass substrates. A seal is provided around the periphery of the substrates, and a gap (which may be at least partially filled with an inert gas such as Ar, Xe, Kr, and/or the like) is maintained between the substrates.

The coated articles shown and described herein, or similar coated articles, may be laminated to another sheet of glass in certain example embodiments. A polymer-based interlayer may be used in certain implementations. Materials such as, for example, PVB, EVA, etc., may be used in different embodiments. In such cases, the coating may be provided between the substrates (e.g., on surface 2 or 3) of the resulting laminated article.

Some or all of the layers described herein may be disposed via sputter depositing or any other suitable technique such as, for example, CVD, combustion deposition, etc. Example layers comprising Ni and Ti, for example, may be sputter-deposited from one or more sputtering targets. The sputtering targets may include about 1-50% Ni and about 50-99% Ti, more preferably 5-40% Ni and about 60-95% Ti, and still more preferably about 10-30% Ni and about 70-90% Ti. In certain example embodiments, the Ni:Ti ratio in the sputtering target may be about 20:80. Other Ni:Ti ratios are possible in different embodiments including, for example, 95/5; 75/25; 50/50; 25/75; 20/80; 10/90; etc. Sub-ranges of these ranges also are contemplated herein. Furthermore, it will be appreciated that the these percentages/ratios may apply with respect to the amount of Ni and/or Ti in the layers, whether such layers are fully or partially oxided or non-oxided (e.g., metallic).

The example materials disclosed herein may be used in connection with low-E, anticondensation, and/or other application. Example low-E and/or anticondensation coatings are described in, for example, application Ser. Nos. 12/926,714; 12/923,082; 12/662,894; 12/659,196; 12/385,234; 12/385,802; 12/461,792; 12/591,611; and Ser. No. 12/654,594, the entire contents of which are hereby incorporated herein by reference. Thus, in certain example embodiments, one or more of the barrier layer materials described herein may replace or supplement one of more of the layers comprising Ni and/or Cr in these and/or other types of coatings.

In the tables above, optical data was gathered with an Ill. "C" observer (2 degrees). The thermal performance data was gathered in accordance with NFRC 2001.

As used herein, the terms "on," "supported by," and the like should not be interpreted to mean that two elements are directly adjacent to one another unless explicitly stated. In other words, a first layer may be said to be "on" or "supported by" a second layer, even if there are one or more layers therebetween.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of making an insulated glass (IG) unit including a coated article including a coating supported by a glass substrate, the method comprising:

having a coated article comprising:

a first dielectric layer on the substrate;

a first layer comprising Ag over at least the first dielectric layer;

a second dielectric layer over at least the first layer comprising Ag;

a second layer comprising Ag over at least the second dielectric layer;

a first layer comprising Ni and Ti over and contacting the second layer comprising Ag;

a third dielectric layer over at least the first layer comprising Ni and Ti;

a third layer comprising Ag over at least the third dielectric layer;

a second layer comprising Ni and Ti over and contacting the third layer comprising Ag; and a fourth dielectric layer over at least the second layer comprising Ni and Ti;

and making the IG unit via steps comprising:

positioning a second substrate in substantially parallel spaced apart relation to said coated article so as to form a gap therebetween;

coupling said coated article and the second substrate, wherein the coating of the coated article is provided on surface 2 or surface 3 of the IG unit; and wherein the IG unit has a LSG of greater than or equal to 2.15.

2. The method of claim 1, wherein the second substrate and the substrate of the coated article are each about 6 mm thick, and wherein the gap between the coated article and the second substrate is about 12 mm.

3. The method of claim 1, wherein the coating has a sheet resistance of less than or equal to about 1.2.

4. The method of claim 1, wherein the coated article has a visible transmission of at least 65%.

5. The method of claim 1, wherein the first dielectric layer comprises zinc oxide, and wherein the first layer comprising Ag is located on and directly contacting the first dielectric layer.

6. The method of claim 1, wherein the fourth dielectric layer comprises silicon nitride.

7. The method of claim 1, wherein at least one of the layers comprising Ni and Ti is from 10-45 angstroms thick.

* * * * *